(12) United States Patent (10) Patent No.: US 12,439,354 B2
Chen et al. (45) Date of Patent: Oct. 7, 2025

(54) UPLINK SIGNAL SENDING AND RECEIVING METHOD, AND APPARATUS

(71) Applicant: Huawei Technologies Co., Ltd., Shenzhen (CN)

(72) Inventors: Ying Chen, Hangzhou (CN); Jianwei Zhou, Hangzhou (CN); Chenlei Xu, Hangzhou (CN); Hejia Luo, Hangzhou (CN); Jun Wang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 369 days.

(21) Appl. No.: 18/301,038

(22) Filed: Apr. 14, 2023

(65) Prior Publication Data

US 2023/0319751 A1 Oct. 5, 2023

Related U.S. Application Data

(63) Continuation of application No. PCT/CN2021/123629, filed on Oct. 13, 2021.

(30) Foreign Application Priority Data

Oct. 16, 2020 (CN) .......................... 202011112273.7

(51) Int. Cl.
*H04W 56/00* (2009.01)
(52) U.S. Cl.
CPC .............................. *H04W 56/0045* (2013.01)

(58) Field of Classification Search
CPC ........... H04W 56/0045; H04W 56/005; H04W 56/00; H04W 72/04; H04L 1/16; H04B 7/185
See application file for complete search history.

(56) References Cited

U.S. PATENT DOCUMENTS

| | | | |
|---|---|---|---|
| 9,448,308 B2 * | 9/2016 | Burroughs | H04W 4/02 |
| 2022/0086918 A1 * | 3/2022 | Liu | H04W 24/08 |
| 2022/0330184 A1 | 10/2022 | Lei | |
| 2022/0376778 A1 * | 11/2022 | Park | H04W 56/001 |
| 2023/0319751 A1 * | 10/2023 | Chen | H04W 56/00 370/350 |
| 2024/0179099 A1 * | 5/2024 | Shrestha | H04W 28/0226 |

FOREIGN PATENT DOCUMENTS

CN 111064539 A 4/2020

* cited by examiner

*Primary Examiner* — Phong La
(74) *Attorney, Agent, or Firm* — Conley Rose, P.C.

(57) ABSTRACT

An uplink signal sending and receiving method includes that a first communication apparatus obtains a first timing advance (TA) change rate, and sends an uplink signal in a plurality of first time periods. There is a first time interval between the plurality of first time periods to compensate for a time synchronization drift. A length of the first time interval and a location of the first time interval between the plurality of first time periods are determined based on the first TA change rate, and the first TA change rate is a TA change rate in a communication process of the first communication apparatus.

19 Claims, 26 Drawing Sheets

Note: T1i indicates an i<sup>th</sup> first time period, and G1j indicates a j<sup>th</sup> first time interval (A)

(B)

Note: T1i indicates an ith first time period, G1j indicates a jth first time interval, and G2k indicates a kth second time interval Note: T1i indicates an ith first time period, T3p indicates a pth third time period, and G1j indicates a jth first time interval Note: T1i indicates an $i^{th}$ first time period, T3p indicates a $p^{th}$ third time period, G1j indicates a $j^{th}$ first time interval, and G2k indicates a $k^{th}$ second time interval

UPLINK SIGNAL SENDING AND RECEIVING METHOD, AND APPARATUS

CROSS-REFERENCE TO RELATED APPLICATIONS

This is a continuation of International Patent Application No. PCT/CN2021/123629 filed on Oct. 13, 2021 which claims priority to Chinese Patent Application No. 202011112273.7 filed on Oct. 16, 2020. The disclosures of the aforementioned applications are hereby incorporated by reference in their entireties.

TECHNICAL FIELD

This application relates to the field of communication technologies, and in particular, to an uplink signal sending and receiving method, and an apparatus.

BACKGROUND

Compared with terrestrial communication, satellite communication has unique advantages, for example, it is capable of providing a wider coverage area and is not vulnerable to damage caused by a natural disaster or external force. If the satellite communication is introduced into 5th generation (5G) communication, the satellite communication can provide communication services for areas that cannot be covered by a terrestrial communication network, such as oceans or forests, to enhance reliability of the 5G communication. For example, the satellite communication can ensure better communication services for aircraft, trains, and users on these vehicles, and provide more data transmission resources for the 5G communication, to increase a network rate. Therefore, supporting communication with both the ground and a satellite is an inevitable trend of the 5G communication. This has great benefits in terms of wide coverage, reliability, multi-connection, a high throughput, and the like.

For convergence of the satellite communication and the 5G communication, convergence of a satellite and a narrowband internet of things (NB IoT) will be discussed later. The NB IoT features a data burst, insensitivity to a delay, massive connections, and wide coverage. These features of the NB IoT can be better supported by the satellite communication.

To improve deep coverage, in a transmission process of a terminal (for example, an IoT device), the terminal sends a repeated uplink signal. In this case, signal transmission lasts for a long time. In a terrestrial network, because both the terminal and a base station are stationary, or the terminal moves slowly, long-time signal transmission does not cause a large time synchronization drift. However, in the satellite communication, due to high-speed movement of a satellite, long-time signal transmission causes a large time synchronization drift. Consequently, a time period in which the terminal sends a signal is not synchronized with a time period in which the satellite receives the signal, and coding performance is reduced.

SUMMARY

Embodiments of this application provide an uplink signal sending and receiving method and an apparatus, to improve coding performance of a satellite.

According to a first aspect, an uplink signal sending method is provided. The method includes that a first communication apparatus obtains a first timing advance (TA) change rate, and the first TA change rate is a TA change rate in a communication process of the first communication apparatus. The first communication apparatus sends an uplink signal in a plurality of first time periods. There is a first time interval between the plurality of first time periods, and a length of the first time interval and a location of the first time interval between the plurality of first time periods are determined based on the first TA change rate. According to the method provided in the first aspect, when sending the uplink signal, a terminal may insert the first time interval between the time periods in which the uplink signal is sent, to compensate for a time synchronization drift. This reduces impact of the time synchronization drift caused by movement of a satellite base station on uplink signal detection performance of the satellite base station, and improves coding performance of the satellite base station.

In a possible implementation, the uplink signal sent in the plurality of first time periods includes a repeated signal. This possible implementation can resolve a problem that the coding performance of the satellite base station is reduced due to an excessively large time synchronization drift caused by repeated signal sending.

In a possible implementation, the first communication apparatus skips performing uplink sending in the first time interval; or the first communication apparatus sends a cyclic suffix (CS) of a signal in the first time interval.

In a possible implementation, the first time interval occurs periodically, and the location of the first time interval between the plurality of first time periods is determined based on duration of the first time interval. In this possible implementation, implementation complexity of the terminal can be reduced.

In a possible implementation, there is a second time interval between the plurality of first time periods, and the second time interval is used to receive system information of a second communication apparatus. The first communication apparatus skips performing uplink sending in the second time interval, duration of the second time interval is the same as duration in which the second communication apparatus sends the system information, and a length of the second time interval is greater than or equal to a length of a time domain resource occupied by the system information. In this possible implementation, a terminal in a connected state can obtain the system information, so that the terminal can compensate for a time synchronization drift and a frequency synchronization drift in an uplink data transmission process based on real-time satellite-related information (such as some information related to satellite mobility or a satellite location) in the system information. In this way, the time synchronization drift and the frequency synchronization drift in the uplink data transmission process that are caused by movement of the satellite base station are reduced. This ensures that the time synchronization drift and frequency synchronization drift can meet a requirement of a communication system, and improves uplink data detection performance and coding performance.

In a possible implementation, the uplink signal is a preamble sequence or uplink data.

In a possible implementation, the first time period is one or more slots. Alternatively, the first time period is one or more subframes. Alternatively, the first time period is duration required for sending one or more preamble sequences.

In a possible implementation, that a first communication apparatus obtains a first TA change rate includes: The first communication apparatus determines the first TA change rate based on geographical location information of the first communication apparatus and location information of the second communication apparatus; or the first communication apparatus receives the first TA change rate from the second communication apparatus. In this possible implementation, a plurality of methods for obtaining the first TA change rate are provided.

In a possible implementation, the length of the first time interval is greater than or equal to a TA change amount in a communication process of the first communication apparatus in a third time period that is before the first time interval and adjacent to the first time interval; and a time period between every two adjacent first time intervals is one third time period, and a time period before a $1^{st}$ first time interval and a time period after a last first time interval each are one third time period. In this possible implementation, the time synchronization drift can be better compensated for.

In a possible implementation, the length of the first time interval and a location of the first time interval between a plurality of third time periods are determined based on a third time interval and the first TA change rate, and the third time interval is a time interval between a plurality of second time periods, and the second time period is a time period in which the second communication apparatus receives the uplink signal; and a time period between every two adjacent first time intervals is one third time period, and a time period before a $1^{st}$ first time interval and a time period after a last first time interval each are one third time period. In this possible implementation, the terminal may determine the first time interval based on the third time interval of the second communication apparatus, so that the time synchronization drift can be better compensated for between the first communication apparatus and the second communication apparatus. In this possible implementation, when sending the uplink signal, the terminal may insert the first time interval between time periods in which the uplink signal is sent, and the satellite base station may insert the third time interval between time periods in which the uplink signal is received, to compensate for the time synchronization drift. This reduces impact of the time synchronization drift caused by movement of the satellite base station on uplink signal detection performance of the satellite base station, and improves coding performance of the satellite base station.

In a possible implementation, when the first TA change rate is positive, the first time interval is a difference between the third time interval and a fourth time interval. Alternatively, when the first TA change rate is negative, the first time interval is a sum of the third time interval and a fourth time interval. The fourth time interval is a time interval obtained through calculation based on the first TA change rate. In this possible implementation, the terminal may accurately compensate for the time synchronization drift.

In a possible implementation, a quantity of third time periods is the same as a quantity of second time periods, and the location of the first time interval between the plurality of third time periods is the same as a location of the third time interval between the plurality of second time periods.

In a possible implementation, the method further includes that the first communication apparatus receives first indication information from the second communication apparatus, and the first indication information indicates a length of the third time interval and the location of the third time interval between the plurality of second time periods. Alternatively, the first communication apparatus determines a length of the third time interval and the location of the third time interval between the plurality of second time periods according to a protocol specification. The first communication apparatus determines the length of the first time interval and the location of the first time interval between the plurality of third time periods based on the length of the third time interval, the location of the third time interval between the plurality of second time periods, and the first TA change rate.

In a possible implementation, the method further includes that the first communication apparatus determines the location of the first time interval between the plurality of first time periods, and calculates the length of the first time interval based on the first TA change rate.

In a possible implementation, the method further includes that the first communication apparatus receives second indication information from the second communication apparatus, the second indication information indicates a first index, and the first index indicates a length of a time interval and a location of the time interval between the plurality of first time periods. The first communication apparatus determines that the length of the time interval corresponding to the first index and a location of the time interval between the plurality of first time periods are respectively the length of the first time interval and the location of the first time interval between the plurality of first time periods. In this possible implementation, the terminal may directly determine the length of the first time interval and the location of the first time interval between the plurality of first time periods based on an indication of the satellite base station and a correspondence. This can reduce complexity of the terminal.

In a possible implementation, the first communication apparatus stores a correspondence among the TA change rate, a length of a time interval, and a location of the time interval between the plurality of first time periods. The method further includes that the first communication apparatus determines the length of the first time interval and the location of the first time interval between the plurality of first time periods from the correspondence based on the first TA change rate. In this possible implementation, the terminal may directly determine the length of the first time interval and the location of the first time interval between the plurality of first time periods based on an indication of the satellite base station and a correspondence. This can reduce complexity of the terminal.

In a possible implementation, the length of the first time interval and the location of the first time interval between the plurality of first time periods are determined based on the first TA change rate and a type of the uplink signal. In this possible implementation, lengths of different first time intervals and the location of the first time interval between the plurality of first time periods may be determined for different types of uplink signals, to meet time synchronization drift compensation requirements of different types of uplink signals.

According to a second aspect, an uplink signal receiving method is provided. The method includes that a second communication apparatus receives an uplink signal from a first communication apparatus, the uplink signal is an uplink signal sent by the first communication apparatus in a plurality of first time periods, there is a first time interval between the plurality of first time periods, a length of the first time interval and a location of the first time interval between the plurality of first time periods are determined based on a first timing advance TA change rate, and the first TA change rate is a TA change rate in a communication process of the first communication apparatus. The second communication apparatus detects the uplink signal. According to the method provided in the second aspect, when sending the uplink signal, a terminal may insert the first time interval between the time periods in which the uplink signal is sent, to compensate for a time synchronization drift. This reduces impact of the time synchronization drift caused by movement of a satellite base station on uplink signal detection performance of the satellite base station, and improves coding performance of the satellite base station.

In a possible implementation, that a second communication device receives an uplink signal from a first communication device includes: The second communication apparatus receives the uplink signal from the first communication apparatus in a plurality of second time periods, there is a third time interval between the plurality of second time periods, and a location of the third time interval between the plurality of second time periods is the same as a location of the first time interval between a plurality of third time periods; and a time period between every two adjacent first time intervals is one third time period, and a time period before a $1^{st}$ first time interval and a time period after a last first time interval each are one third time period. In this possible implementation, when sending the uplink signal, the terminal may insert the first time interval between time periods in which the uplink signal is sent, and the satellite base station may insert the third time interval between time periods in which the uplink signal is received, to compensate for a time synchronization drift. This reduces impact of the time synchronization drift caused by movement of the satellite base station on uplink signal detection performance of the satellite base station, and improves coding performance of the satellite base station.

In a possible implementation, the second communication apparatus skips performing uplink receiving in the third time interval. Alternatively, the second communication apparatus receives, in the third time interval, a CS of a signal sent by the first communication apparatus.

In a possible implementation, the second time period is one or more slots. Alternatively, the second time period is one or more subframes. Alternatively, the second time period is duration required for sending one or more preamble sequences.

In a possible implementation, a length of the third time interval and the location of the third time interval between the plurality of second time periods are specified in a protocol.

In a possible implementation, the method further includes: The second communication apparatus obtains a second TA change rate, and the second TA change rate is a maximum TA change rate in a service area of the second communication apparatus. The second communication apparatus determines a length of the third time interval and the location of the third time interval between the plurality of second time periods based on the second TA change rate. In this possible implementation, to align preamble sequence detection of all terminals as much as possible, the third time interval inserted by the satellite base station may be a maximum length that may be required, in other words, corresponds to a maximum TA change rate in a service area of the satellite base station. Then the terminal further performs adjustment based on a TA change rate of the terminal, to implement accurate synchronization with the satellite base station.

In a possible implementation, the length of the first time interval and the location of the first time interval between the plurality of third time periods are determined based on the third time interval and the first TA change rate. In this possible implementation, the terminal may determine the first time interval based on the third time interval of the second communication apparatus, so that the time synchronization drift can be better compensated for between the first communication apparatus and the second communication apparatus.

In a possible implementation, when the first TA change rate is positive, the first time interval is a difference between the third time interval and a fourth time interval. Alternatively, when the first TA change rate is negative, the first time interval is a sum of the third time interval and a fourth time interval. The fourth time interval is a time interval obtained through calculation based on the first TA change rate. In this possible implementation, the terminal may accurately compensate for the time synchronization drift.

In a possible implementation, the method further includes that the second communication apparatus sends first indication information to the first communication apparatus, and the first indication information indicates the length of the third time interval and the location of the third time interval between the plurality of second time periods.

In a possible implementation, the length of the third time interval and the location of the third time interval between the plurality of second time periods are determined based on the second TA change rate and a type of the uplink signal. In this possible implementation, lengths of different first time intervals and the location of the first time interval between the plurality of first time periods may be determined for different types of uplink signals, to meet time synchronization drift compensation requirements of different types of uplink signals.

In a possible implementation, the third time interval occurs periodically, and the location of the third time interval between the plurality of second time periods is determined based on duration of the third time interval. In this possible implementation, implementation complexity of the terminal can be reduced.

In a possible implementation, the uplink signal sent in the plurality of first time periods includes a repeated signal. This possible implementation can resolve a problem that the coding performance of the satellite base station is reduced due to an excessively large time synchronization drift caused by repeated signal sending.

In a possible implementation, the uplink signal is a preamble sequence or uplink data.

According to a third aspect, a first communication apparatus is provided. The apparatus includes a processing unit and a communication unit. The processing unit is configured to obtain a first TA change rate, and the first TA change rate is a TA change rate in a communication process of the first communication apparatus. The communication unit is configured to send an uplink signal in a plurality of first time periods, there is a first time interval between the plurality of first time periods, and a length of the first time interval and a location of the first time interval between the plurality of first time periods are determined based on the first TA change rate.

In a possible implementation, the uplink signal sent in the plurality of first time periods includes a repeated signal.

In a possible implementation, the first communication apparatus skips performing uplink sending in the first time interval; or the first communication apparatus sends a CS of a signal in the first time interval.

In a possible implementation, the first time interval occurs periodically, and the location of the first time interval between the plurality of first time periods is determined based on duration of the first time interval.

In a possible implementation, there is a second time interval between the plurality of first time periods, and the second time interval is used to receive system information of a second communication apparatus. The first communication apparatus skips performing uplink sending in the second time interval, duration of the second time interval is the same as duration in which the second communication apparatus sends system information, and a length of the second time interval is greater than or equal to a length of a time domain resource occupied by the system information.

In a possible implementation, the uplink signal is a preamble sequence or uplink data.

In a possible implementation, the first time period is one or more slots. Alternatively, the first time period is one or more subframes. Alternatively, the first time period is duration required for sending one or more preamble sequences.

In a possible implementation, the processing unit is further configured to determine the first TA change rate based on geographical location information of the first communication apparatus and location information of the second communication apparatus; or receive the first TA change rate from the second communication apparatus by using the communication unit.

In a possible implementation, the length of the first time interval is greater than or equal to a TA change amount in a communication process of the first communication apparatus in a third time period that is before the first time interval and adjacent to the first time interval; and a time period between every two adjacent first time intervals is one third time period, and a time period before a $1^{st}$ first time interval and a time period after a last first time interval each are one third time period.

In a possible implementation, the length of the first time interval and a location of the first time interval between a plurality of third time periods are determined based on a third time interval and the first TA change rate, and the third time interval is a time interval between a plurality of second time periods, and the second time period is a time period in which the second communication apparatus receives the uplink signal; and a time period between every two adjacent first time intervals is one third time period, and a time period before a $1^{st}$ first time interval and a time period after a last first time interval each are one third time period.

In a possible implementation, when the first TA change rate is positive, the first time interval is a difference between the third time interval and a fourth time interval. Alternatively, when the first TA change rate is negative, the first time interval is a sum of the third time interval and a fourth time interval. The fourth time interval is a time interval obtained through calculation based on the first TA change rate.

In a possible implementation, a quantity of third time periods is the same as a quantity of second time periods, and the location of the first time interval between the plurality of third time periods is the same as a location of the third time interval between the plurality of second time periods.

In a possible implementation, the communication unit is further configured to receive first indication information from the second communication apparatus, and the first indication information indicates a length of the third time interval and the location of the third time interval between the plurality of second time periods. Alternatively, the processing unit is further configured to determine a length of the third time interval and the location of the third time interval between the plurality of second time periods according to a protocol specification. The processing unit is further configured to determine the length of the first time interval and the location of the first time interval between the plurality of third time periods based on the length of the third time interval, the location of the third time interval between the plurality of second time periods, and the first TA change rate.

In a possible implementation, the processing unit is further configured to: determine the location of the first time interval between the plurality of first time periods, and calculate the length of the first time interval based on the first TA change rate.

In a possible implementation, the communication unit is further configured to receive second indication information from the second communication apparatus, where the second indication information indicates a first index, and the first index indicates a length of a time interval and a location of the time interval between the plurality of first time periods. The processing unit is further configured to determine that the length of the time interval corresponding to the first index and a location of the time interval between the plurality of first time periods are respectively the length of the first time interval and the location of the first time interval between the plurality of first time periods.

In a possible implementation, the first communication apparatus stores a correspondence among the TA change rate, a length of a time interval, and a location of the time interval between the plurality of first time periods. The processing unit is further configured to determine the length of the first time interval and the location of the first time interval between the plurality of first time periods from the correspondence based on the first TA change rate.

In a possible implementation, the length of the first time interval and the location of the first time interval between the plurality of first time periods are determined based on the first TA change rate and a type of the uplink signal.

According to a fourth aspect, a second communication apparatus is provided. The apparatus includes a communication unit and a processing unit. The communication unit is configured to receive an uplink signal from a first communication apparatus, the uplink signal is an uplink signal sent by the first communication apparatus in a plurality of first time periods, there is a first time interval between the plurality of first time periods, a length of the first time interval and a location of the first time interval between the plurality of first time periods are determined based on a first timing advance TA change rate, and the first TA change rate is a TA change rate in a communication process of the first communication apparatus. The processing unit is configured to detect the uplink signal.

In a possible implementation, the communication unit is specifically configured to: receive the uplink signal from the first communication apparatus in a plurality of second time periods, where there is a third time interval between the plurality of second time periods, and a location of the third time interval between the plurality of second time periods is the same as a location of the first time interval between the plurality of third time periods; and a time period between every two adjacent first time intervals is one third time period, and a time period before a $1^{st}$ first time interval and a time period after a last first time interval each are one third time period.

In a possible implementation, the second communication apparatus skips performing uplink receiving in the third time interval. Alternatively, the second communication apparatus receives, in the third time interval, a CS of a signal sent by the first communication apparatus.

In a possible implementation, the second time period is one or more slots. Alternatively, the second time period is one or more subframes. Alternatively, the second time period is duration required for sending one or more preamble sequences.

In a possible implementation, a length of the third time interval and the location of the third time interval between the plurality of second time periods are specified in a protocol.

In a possible implementation, the processing unit is further configured to: obtain a second TA change rate, where the second TA change rate is a maximum TA change rate in a service area of the second communication apparatus; and determine a length of the third time interval and the location of the third time interval between the plurality of second time periods based on the second TA change rate.

In a possible implementation, the length of the first time interval and the location of the first time interval between the plurality of third time periods are determined based on the third time interval and the first TA change rate.

In a possible implementation, when the first TA change rate is positive, the first time interval is a difference between the third time interval and a fourth time interval. Alternatively, when the first TA change rate is negative, the first time interval is a sum of the third time interval and a fourth time interval. The fourth time interval is a time interval obtained through calculation based on the first TA change rate.

In a possible implementation, the communication unit is further configured to send first indication information to the first communication apparatus, and the first indication information indicates the length of the third time interval and the location of the third time interval between the plurality of second time periods.

In a possible implementation, the length of the third time interval and the location of the third time interval between the plurality of second time periods are determined based on the second TA change rate and a type of the uplink signal.

In a possible implementation, the third time interval occurs periodically, and the location of the third time interval between the plurality of second time periods is determined based on duration of the third time interval.

In a possible implementation, the uplink signal sent in the plurality of first time periods includes a repeated signal.

In a possible implementation, the uplink signal is a preamble sequence or uplink data.

According to a fifth aspect, a communication apparatus is provided. The apparatus includes a processor. The processor is connected to a memory, and the memory is configured to store computer-executable instructions. The communication apparatus may be a first communication apparatus or a second communication apparatus. When the communication apparatus is a first communication apparatus, the processor executes the computer-executable instructions stored in the memory, to implement any method provided in the first aspect. When the communication apparatus is a second communication apparatus, the processor executes the computer-executable instructions stored in the memory, to implement any method provided in the second aspect. For example, the memory and the processor may be integrated together, or may be independent components. If the memory and the processor are independent components, the memory may be located inside the communication apparatus, or may be located outside the communication apparatus.

In a possible implementation, the processor includes a logic circuit, and further includes an input interface and/or an output interface. For example, the output interface is configured to perform a sending action in a corresponding method, and the input interface is configured to perform a receiving action in the corresponding method.

In a possible implementation, the communication apparatus further includes a communication interface and a communication bus. The processor, the memory, and the communication interface are connected through the communication bus. The communication interface is configured to perform receiving and sending actions in a corresponding method. The communication interface may also be referred to as a transceiver. Optionally, the communication interface includes at least one of a transmitter and a receiver. In this case, the transmitter is configured to perform a sending action in a corresponding method, and the receiver is configured to perform a receiving action in a corresponding method.

In a possible implementation, the communication apparatus exists in a product form of a chip.

According to a sixth aspect, a communication apparatus is provided. The apparatus includes a processor, a memory, and a computer program that is stored in the memory and runs on the processor. The communication apparatus may be a first communication apparatus or a second communication apparatus. When the communication apparatus is a first communication apparatus, and the computer program runs, the first communication apparatus is enabled to perform any method provided in the first aspect. When the communication apparatus is a second communication apparatus, and the computer program runs, the second communication apparatus is enabled to perform any method provided in the second aspect.

According to a seventh aspect, a communication apparatus is provided. The apparatus includes a processor and an interface, and the processor is coupled to a memory through the interface. The communication apparatus may be a first communication apparatus or a second communication apparatus. When the communication apparatus is a first communication apparatus, and the processor executes a computer program or computer-executable instructions in the memory, any method provided in the first aspect is performed. When the communication apparatus is a second communication apparatus, and the processor executes a computer program or computer-executable instructions in the memory, any method provided in the second aspect is performed. The communication apparatus may exist in a product form of a chip.

According to an eighth aspect, a computer-readable storage medium is provided. The computer-readable storage medium includes computer-executable instructions. When the computer-executable instructions are run on a computer, the computer is enabled to perform any method provided in the first aspect or the second aspect.

According to a ninth aspect, a computer program product is provided. The computer program product includes computer-executable instructions. When the computer-executable instructions are run on a computer, the computer is enabled to perform any method provided in the first aspect or the second aspect.

According to a tenth aspect, a communication system is provided. The system includes one or more of the foregoing first communication apparatus and the foregoing second communication apparatus.

For technical effect brought by any implementation of the fifth aspect to the tenth aspect, refer to technical effect brought by a corresponding implementation in the first aspect or the second aspect. Details are not described herein again.

It should be noted that solutions in the foregoing aspects may be combined on a premise that the solutions are not contradictory.

DESCRIPTION OF EMBODIMENTS

In descriptions of this application, unless otherwise stated, "/" indicates "or". For example, A/B may indicate A or B. A term "and/or" in this specification describes only an association relationship between associated objects and indicates that there may be three relationships. For example, A and/or B may indicate the following three cases: Only A exists, both A and B exist, and only B exists. In the descriptions of this application, unless otherwise stated, "at least one" means one or more, and "a plurality of" means two or more.

In addition, to clearly describe technical solutions in embodiments of this application, terms such as "first" and "second" are used in embodiments of this application to distinguish between same items or similar items that provide basically same functions or purposes. A person skilled in the art may understand that the terms such as "first" and "second" do not limit a quantity or an execution sequence, and the terms such as "first" and "second" do not indicate a definite difference.

The technical solutions in embodiments of this application may be applied to a 4th generation (4G) system, various systems evolved based on the 4G system, a 5G system, and various systems evolved based on the 5G system. The 4G system may also be referred to as an evolved packet system (EPS). A core network (CN) of the 4G system may be referred to as an evolved packet core (EPC), and an access network may be referred to as Long-Term Evolution (LTE). A core network of the 5G system may be referred to as a 5G core (5GC), and an access network may be referred to as new radio (NR).

Figure 1:
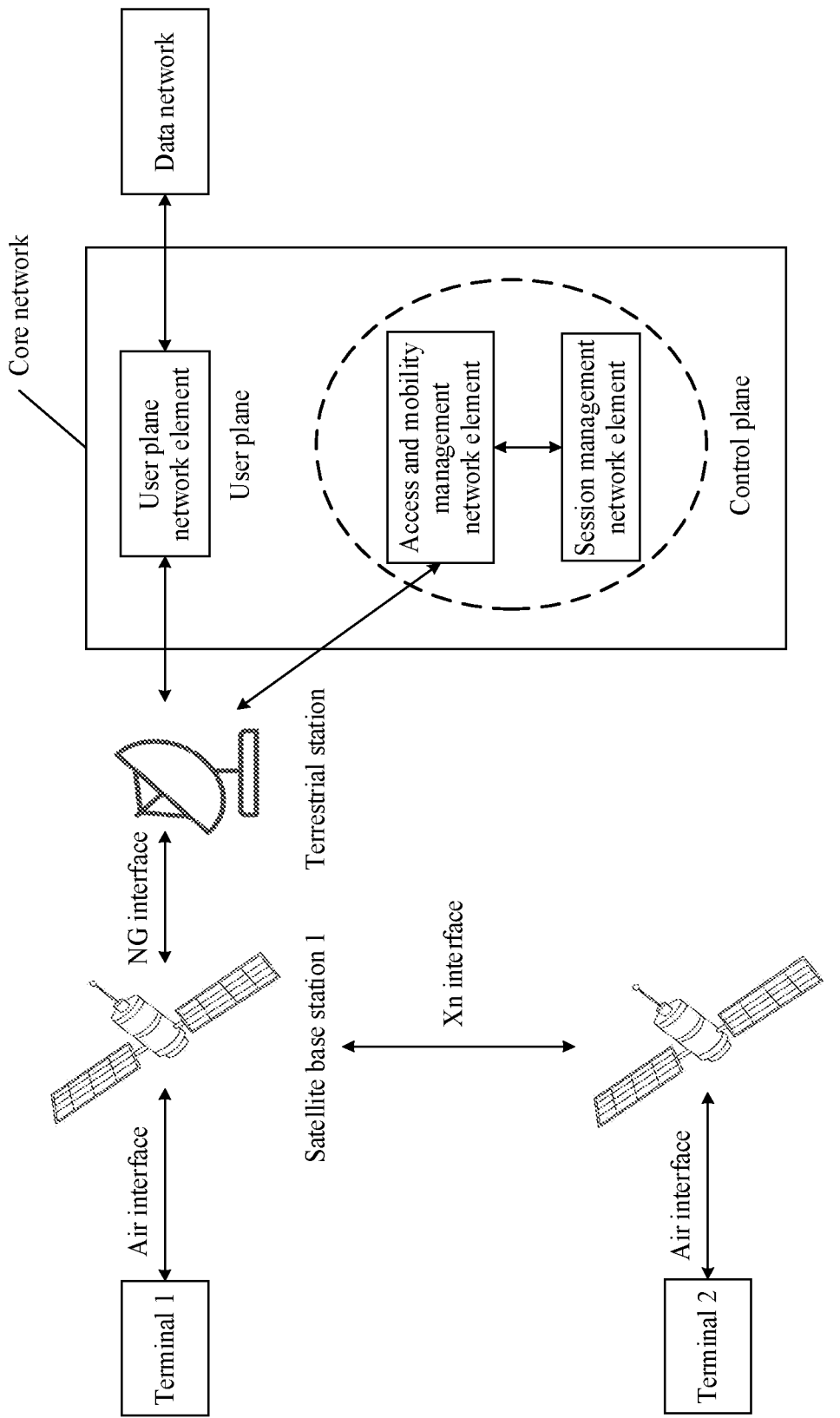
FIG. 1 is a schematic diagram of a network application architecture according to an embodiment of this application.

This application relates to the field of satellite communication. FIG. 1 shows an example of a network application architecture. A terminal located on the ground accesses, through an air interface (the air interface may be various types of air interfaces, such as a 4G air interface and a 5G air interface), a base station (referred to as a satellite base station) deployed on a satellite. For example, a terminal 1 may access a satellite base station 1, and a terminal 2 may access a satellite base station 2. The satellite base station 1 communicates with a terrestrial station (which may also be referred to as a satellite terrestrial station) through a radio link, and is connected to a core network by using the terrestrial station. The satellite base station 1 may perform user data transmission with a data network by using a user plane of the core network, and may perform signaling interaction by using a control plane of the core network. In addition, there is a radio link between satellite base stations (for example, between the satellite base station 1 and the satellite base station 2), to complete signaling interaction and user data transmission between the satellite base stations. Based on a requirement of an application scenario, the satellite base station 2 may be connected to another terrestrial station, and is connected to the core network by using the other terrestrial station. Alternatively, the satellite base station 2 may not be connected to a terrestrial station, but forward data by using the satellite base station 1. Network elements and interfaces between the network elements in FIG. 1 are described as follows.

Terminal: The terminal is a device that provides voice and/or data connectivity for a user and supports satellite base station communication. The terminal and a satellite base station communicate with each other by using an air interface technology (such as an NR technology or an LTE technology), and the terminal accesses a satellite network through an air interface to initiate a service such as a calling service or an Internet access service. The terminal includes a mobile device, typically, such as a phone, a tablet (pad), a mobile phone (or referred to as a "cellular" phone), a smartphone, a satellite wireless device, a wireless modem card, or a computer with a mobile terminal, and further includes a communication device mounted on a vehicle, a communication device mounted on an uncrewed aerial vehicle, an IoT device, a machine type communication terminal, a road side unit (RSU), a personal communication service (PCS) phone, a cordless phone, a session initiation protocol (SIP) phone, a wireless local loop (WLL) station, a personal digital assistant (PDA), a virtual reality (VR) terminal, an augmented reality (AR) terminal, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, a terminal in a 5G network or a future communication network, or the like. The terminal may also be referred to as user equipment (UE), a terminal device, a subscriber unit, a subscriber station, a mobile station, a mobile, a remote station, an access point, an access terminal, a user terminal, a user agent, or the like.

Satellite base station: The satellite base station mainly provides a radio access service, schedules radio resources for an access terminal, and provides a reliable radio transmission protocol, a reliable data encryption protocol, and the like. The satellite base station in this application may be specifically an asynchronous satellite base station, that is, a base station deployed on an asynchronous satellite.

Terrestrial station: The terrestrial station is responsible for forwarding signaling and service data between a satellite base station and a core network.

The satellite base station or the terrestrial station may be an evolved NodeB (eNB or eNodeB) in LTE, or a base station in a 5G network or a future evolved public land mobile network (PLMN), a broadband network gateway (BNG), an aggregation switch, a non-3rd Generation Partnership Project (3GPP) access device, or the like. This is not specifically limited in embodiments of this application. Optionally, a base station in embodiments of this application may include base stations in various forms, for example, a macro base station, a micro base station (also referred to as a small cell), a relay station, an access point, a next-generation base station (gNodeB, gNB), a transmitting and receiving point (TRP), a transmitting point (TP), a mobile switching center, a device responsible for a base station function in device-to-device (D2D), vehicle-to-everything (V2X), and machine-to-machine (M2M) communication, and the like. A core network mainly provides services such as user access control, mobility management, session management, user security authentication, and charging. The core network includes a plurality of functional units, which can be classified into a control-plane functional entity and a user-plane functional entity.

Data network: The data network is an operator network that provides data transmission services for users, for example, an IP multi-media service (IMS) and the Internet.

Air interface: The air interface is a radio link between a terminal and a base station.

Xn interface: The Xn interface is an interface between satellite base stations, and is mainly for signaling interaction such as handover. The Xn interface is an interface name in a 5G system. In another communication system, for example, a 4G system, the interface may have another name.

NG interface: The NG interface is an interface between a satellite base station and a core network, and is mainly for interaction of signaling such as a non-access-stratum (NAS) of a core network and service data of a user. The NG interface is an interface name in a 5G system. In another communication system, for example, a 4G system, the interface may have another name.

When this application is applied to a communication system, the foregoing network elements each are a network element in a corresponding communication system. For example, when this application is applied to a 4G system, the foregoing network elements are network elements in the 4G system, and when this application is applied to a 5G system, the foregoing network elements are network elements in the 5G system. For example, when the application is applied to the 5G system, a user plane network element may be a user plane function (UPF) network element, an access and mobility management network element may be an access and mobility management function (AMF) network element, a session management network element may be a session management function (SMF) network element, and a data network (DN). The UPF is mainly responsible for data packet filtering, data transmission/forwarding, rate control, charging information generation, user plane quality of service (QoS) processing, uplink transmission authentication, transmission class verification, downlink data packet buffering, downlink data notification triggering, traffic statistics collection, lawful interception, and the like of the terminal. The AMF is mainly responsible for functions of a signaling processing part, for example, terminal registration management, terminal connection management, terminal reachability management, terminal access authorization and access authentication, a terminal security function, terminal mobility management (such as terminal location update, terminal registration with a network, and terminal handover), network slice selection, SMF selection, and terminal registration or deregistration. The SMF is mainly responsible for all control plane functions of session management of the terminal, including UPF selection, control, and redirection, Internet Protocol (IP) address allocation and management, session QoS management, obtaining a policy and charging control (PCC) policy from the PCF, bearer or session establishment, modification, and release, and the like. When this application is applied to the 4G system or another communication system, a network element in this application may be replaced with a network element that has a same or similar function in a corresponding communication system.

To make a method provided in embodiments of this application clearer, some content in this application is first briefly described.

1. Transmission of a Narrowband Physical Random Access Channel (NPRACH) in an NB IoT.

In the NPRACH, a preamble sequence is transmitted in a single-tone frequency-hopping manner. The preamble sequence sent by a terminal is used to establish synchronization with a base station in a random access process. For example, a preamble sequence whose subcarrier spacing is 3.75 kilohertz (kHz) includes one cyclic prefix (CP) and five symbols, and a symbol length is 266.7 microseconds (s). There are two CP lengths. One is a short CP and a length is 66.7 s. For details, refer to (A) in FIG. 2. The other is a long CP and a length is 266.7 s. For details, refer to (B) in FIG. 2. A preamble sequence whose subcarrier spacing is 1.25 kHz includes one CP and three symbols, a CP length is 800 s, and a symbol length is 800 s. For details, refer to (C) in FIG. 2.

Figure 3:
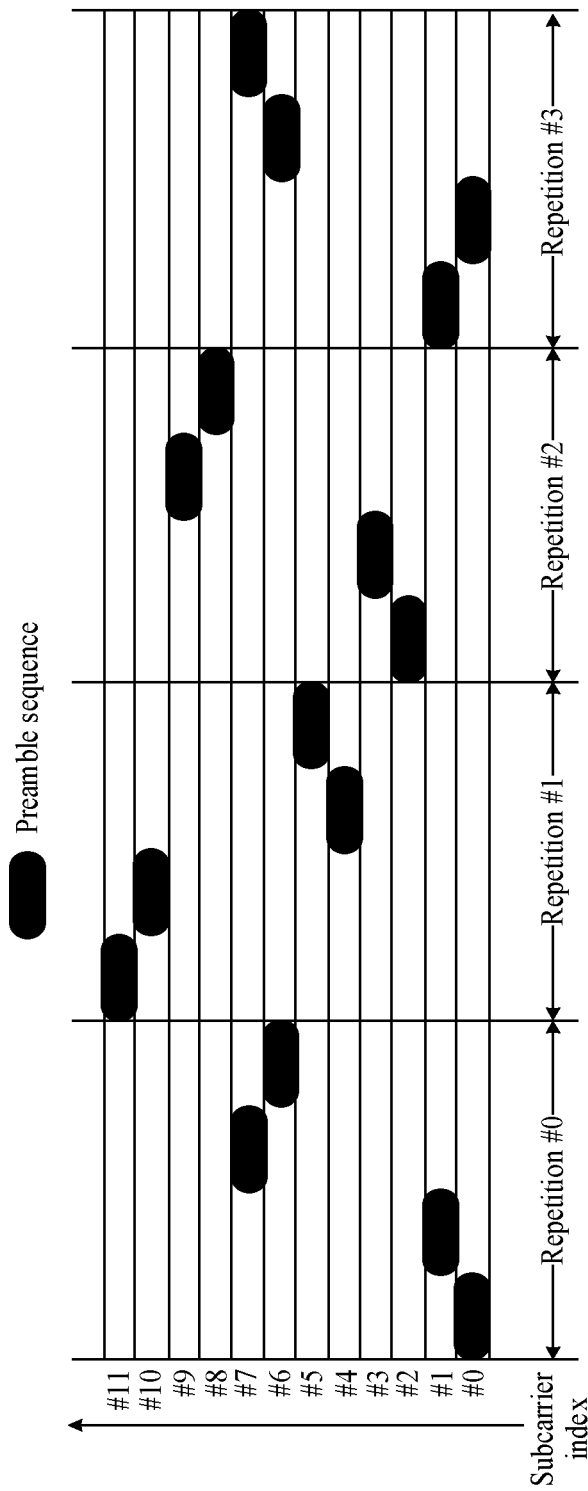
FIG. 3 is a schematic diagram of repeatedly transmitting a preamble sequence group according to an embodiment of this application.

A repeated preamble sequence is used to enhance wide coverage and deep coverage. A set of configurable quantities of repetitions is {1, 2, 4, 8, 16, 32, 64, 128}. The preamble sequence is repeated based on a preamble sequence group when repeated. Each preamble sequence group includes four preamble sequences in a frequency hopping manner. Frequency hopping manners between a preamble sequence group and a preamble sequence group may be the same or may be different. For example, FIG. 3 shows a repetition of a preamble sequence. Repeated preamble sequences are located in four preamble sequence groups, and four preamble sequences are transmitted in each preamble sequence group. When a quantity of repetitions does not exceed 64, all repeated preamble sequences are continuously transmitted.

2. UP GAP in an NB IoT

Because there is a large quantity of repetitions of uplink signals (for example, preamble sequences or uplink data) in the NB IoT, a gap (referred to as an UP GAP) is inserted in an uplink transmission process. In the UP GAP, a terminal switch to a downlink for timing/frequency synchronization. A configuration (no indication is required) is applied to all terminals, that is, {transmission duration, interval}={X, Y}. When uplink transmission duration is greater than or equal to X, the UP GAP is inserted.

Figure 4:
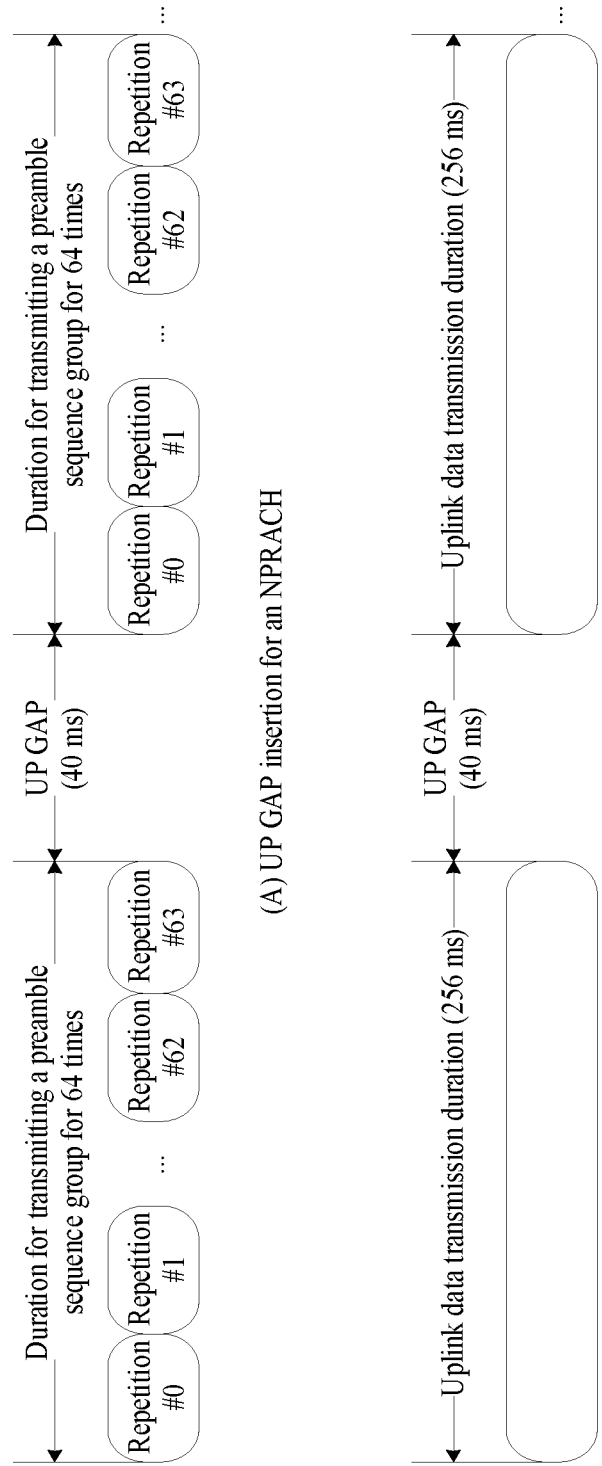
FIG. 4 is a schematic diagram of an uplink gap (UP GAP) according to an embodiment of this application.

For an NPRACH, refer to (A) in FIG. 4, {X, Y}={64× duration of a preamble sequence group, 40 ms}. Because a length of each preamble sequence group is determined based on a symbol length and a CP length, duration of continuous transmission of 64 preamble sequence groups varies with the CP length and the symbol length. In this application, "ms" is "millisecond", and "x" is "multiply".

For a narrowband physical uplink data channel (narrowband physical uplink shared channel, NPUSCH), refer to (B) in FIG. 4, {X, Y}={256 ms, 40 ms}. Compared with the NPRACH, the NPUSCH is inserted at an interval of fixed transmission duration.

3. Timing Advance (TA)

To avoid intra-cell interference, a base station requires that moments at which signals of different terminals in a same subframe but on different frequency domain resources (for example, different resource blocks (RB)) arrive at the base station are basically aligned. Therefore, an uplink timing advance mechanism is provided. From a perspective of a terminal, a TA is essentially a negative offset between a start moment at which a downlink subframe is received and a moment at which an uplink subframe is transmitted. The base station may control, by properly controlling an offset of each terminal, moments at which uplink signals from different terminals arrive at the base station. A terminal far from the base station has a high transmission delay. Therefore, the terminal far from the base station needs to send an uplink signal earlier than a terminal close to the base station. In other words, a TA corresponding to the terminal far from the base station is greater than a TA corresponding to the terminal close to the base station. The TA is a communication delay corresponding to twice the communication distance.

4. TA Change Rate

Figure 5:
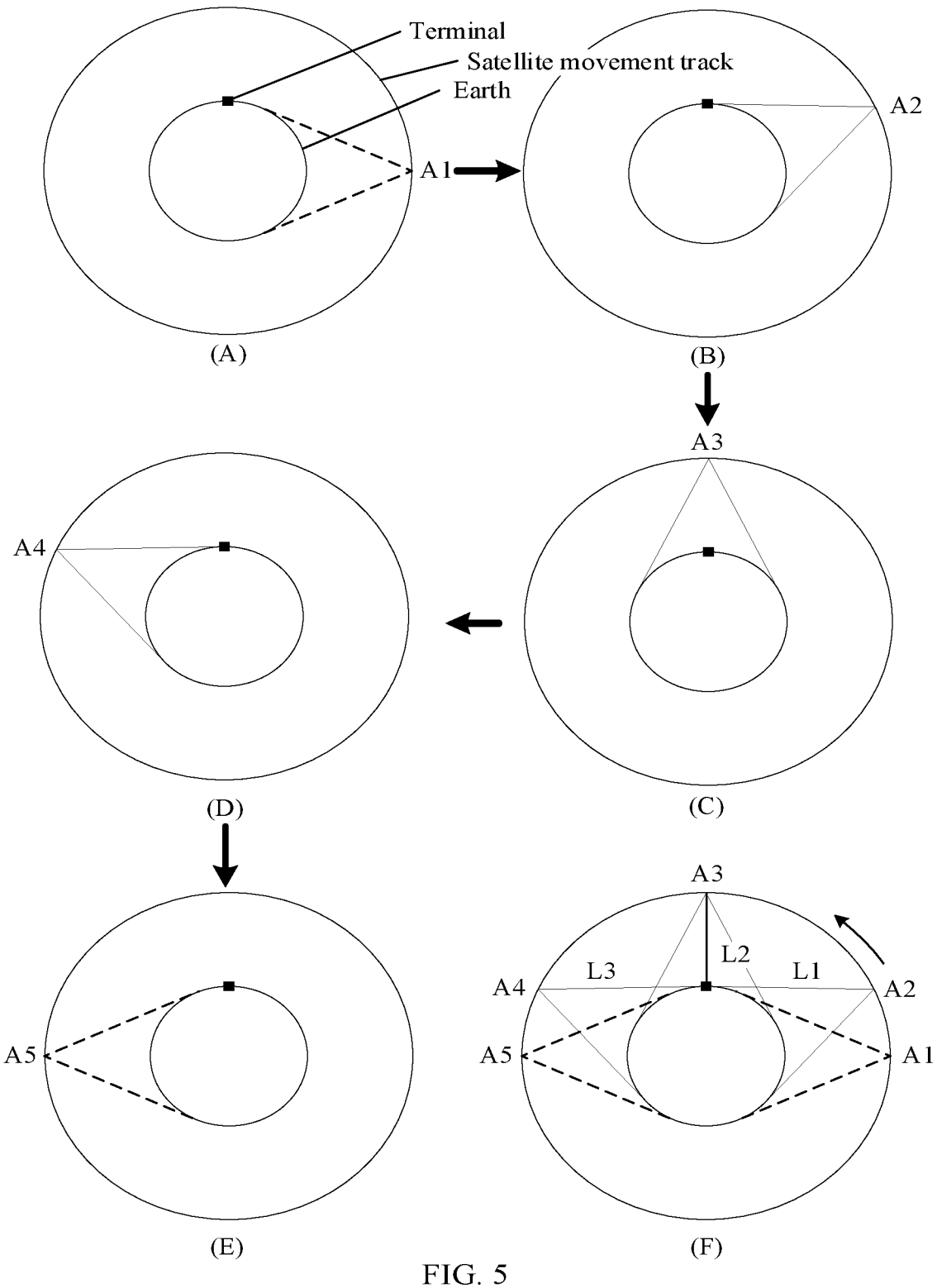
FIG. 5 is a schematic diagram of a satellite movement track according to an embodiment of this application.

It should be noted that, in a movement process of a satellite base station, a satellite can provide a service for a terminal only in a part of time. As shown in (A) in FIG. 5, when moving to a point A1, the satellite base station cannot provide a service for the terminal. As shown (B) in FIG. 5, when moving to a point A2, the satellite base station starts to provide a service for the terminal. As shown in (C) in FIG. 5, when moving to a point A3, the satellite base station is closest to the terminal. As shown (D) in FIG. 5, when moving to a point A4, the satellite base station may also provide a service for the terminal. As shown (E) in FIG. 5, when the satellite base station passes the point A4, for example, moves to a point A5, the satellite base station cannot provide a service for the terminal. For an entire process from (A) in FIG. 5 to (E) in FIG. 5, refer to (F) in FIG. 5. It can be learned from (F) in FIG. 5 that a change of a communication distance between the terminal and the satellite base station is from farthest, closer, closest, farther, to farthest. A method for calculating the TA change rate is as follows: (2×(communication distance at a moment t2−communication distance at a moment t1)/C)/(t2−t1), where C indicates a speed of light, and the moment t2 is later than the moment t1. As shown in (F) in FIG. 5, when the satellite base station moves to the point A2, the communication distance is L1, and when the satellite base station moves to the point A3, the communication distance is L2, and L2 is less than L1. It can be learned that, when the communication distance between the satellite base station and the terminal becomes shorter, the TA change rate is negative. When the satellite base station moves to the point A4, the communication distance is L3, and L3 is greater than L2. It can be learned that when the communication distance between the satellite base station and the terminal becomes longer, the TA change rate is positive.

Figure 6:
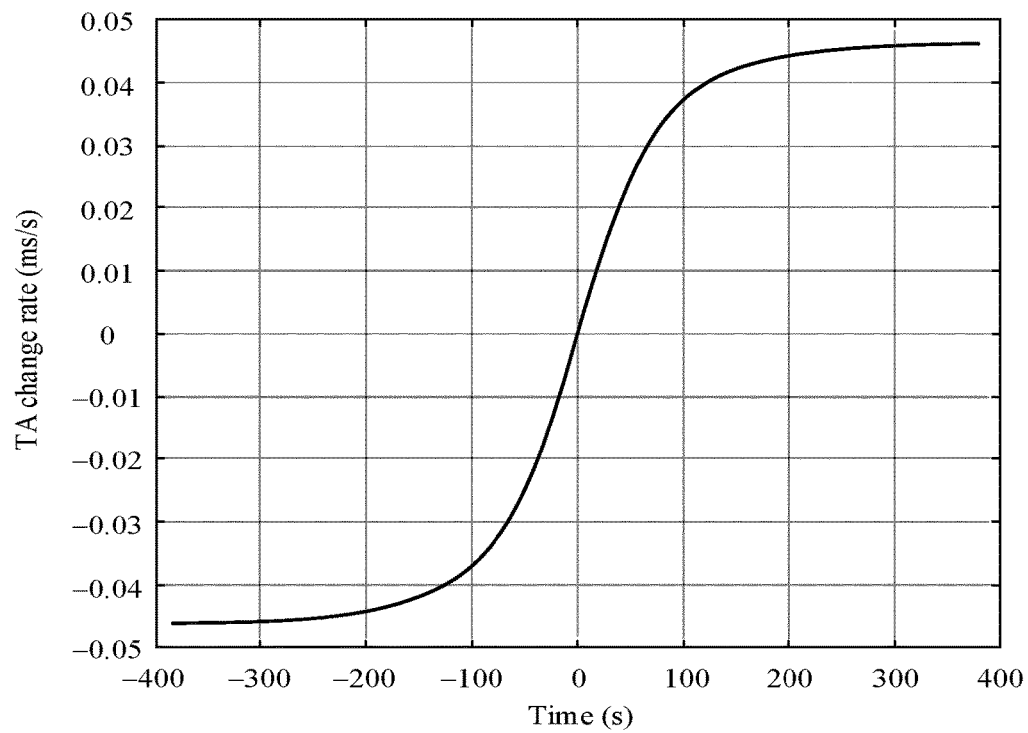
FIG. 6 is a schematic diagram of a TA change rate according to an embodiment of this application.

It may be understood that, with movement of the satellite base station, the communication distance between the terminal and the satellite base station does not change at a constant speed. Therefore, TA change rates are different at different moments. For example, FIG. 6 shows a process in which a TA change rate of a terminal changes with time when a height of a satellite base station is 600 kilometers (km). A horizontal axis in FIG. 6 may alternatively be a communication elevation angle of the terminal relative to the satellite base station.

Figure 7:
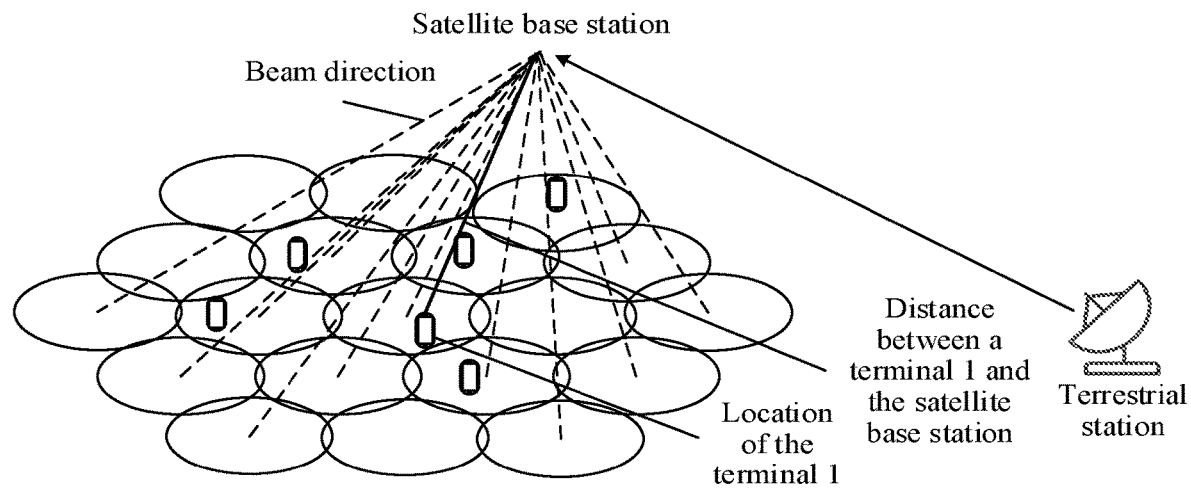
FIG. 7 is a schematic diagram of a coverage range of a satellite base station according to an embodiment of this application.

It may be understood that a coverage area (that is, a service area) of the satellite base station is a large area. As shown in FIG. 7, there are a plurality of beams in a coverage area of a satellite base station, and each beam has a different communication elevation angle, to be specific, distances between the satellite base station and terminals in different beams are different, and TA change rates of the beams caused by movement of the satellite base station are also different.

Based on description of the TA change rate between the terminal and the satellite base station, it may be understood that because the movement of satellite base station, there is also a TA change rate between the satellite base station and a terrestrial station. Similarly, when data communication is performed between the satellite base station and the terrestrial station, a time synchronization drift also exists.

5. Satellite Ephemeris

The satellite ephemeris is used to describe a location and a speed of a space flight body. For example, the satellite ephemeris may determine parameters of the flight body, such as time, coordinates, an azimuth, and a speed based on a mathematical relationship between six orbital parameters of Kepler's law, and has extremely high precision. The satellite ephemeris can accurately calculate, predict, describe, and track running statuses of the satellite and flight body, such as time, locations, and speeds, and can express precise parameters of flight bodies, such as a celestial body, the satellite, a spacecraft, a missile, and space garbage.

The foregoing briefly describes some content in this application.

It can be learned from the foregoing content that the terminal continuously performs uplink transmission for a preamble sequence and uplink data in transmission duration X. In an existing NB IoT, it is assumed that both the terminal and the base station are stationary, so that long-time signal transmission does not cause a large time synchronization drift. However, in the satellite communication, due to high-speed movement of the satellite base station, the long-time signal transmission causes a large time synchronization drift. Consequently, a time period in which the terminal sends a signal is not synchronized with a time period in which the satellite base station receives the signal, strength of the signal received by the satellite base station is reduced, and coding performance is reduced.

Figure 8:
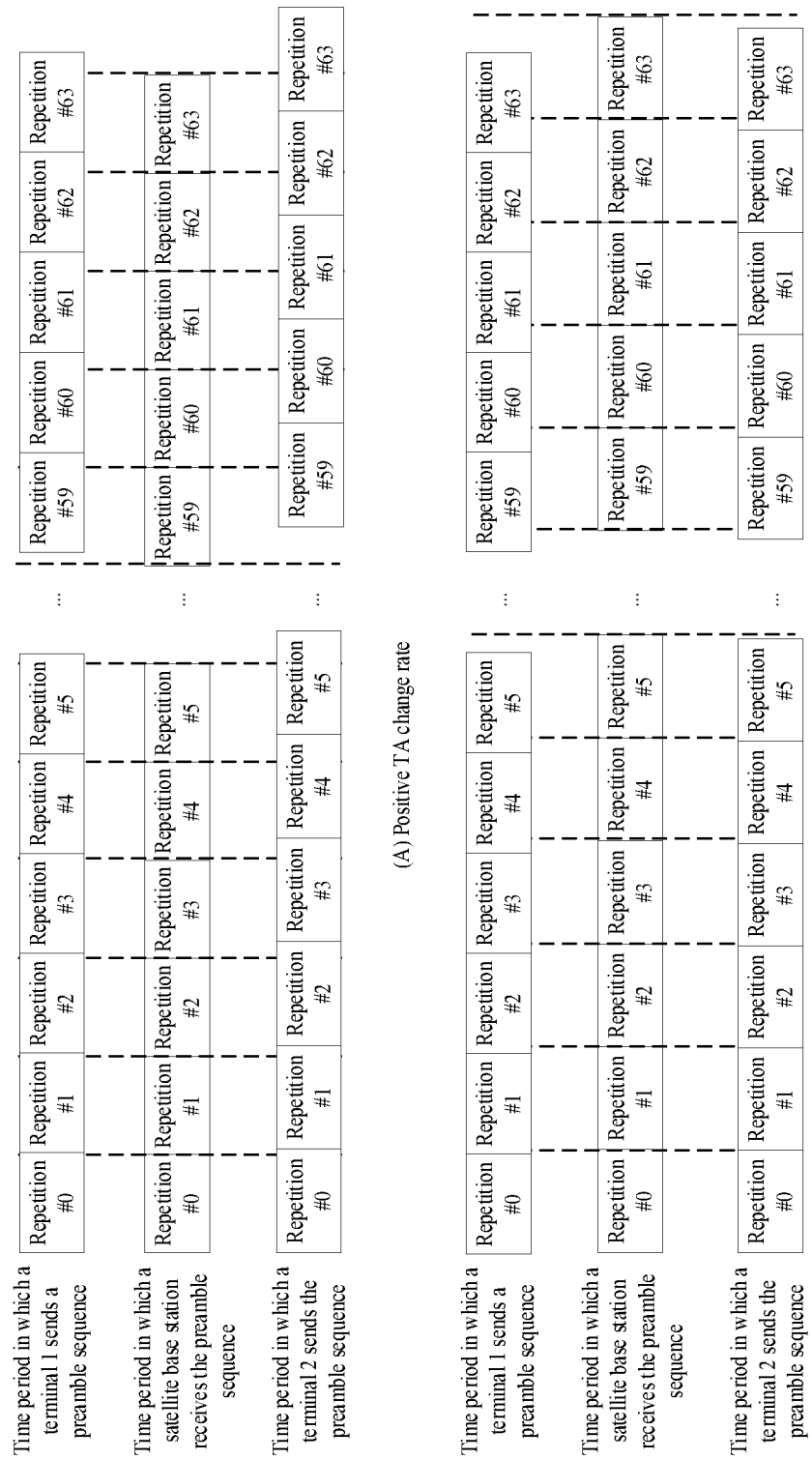
FIG. 8 is a schematic diagram of a positive/negative TA change rate according to an embodiment of this application.

For example, for the preamble sequence, as shown in FIG. 8, when a positive TA change rate is generated, before the terminal sends an entire preamble sequence, the satellite base station has considered that the entire preamble sequence is received. When a negative TA change rate is generated, after the terminal sends the entire preamble sequence, the satellite base station continues to receive the preamble sequence. Consequently, a window for the satellite base station to receive the signal does not match a time point at which the signal arrives at the satellite base station. Because the preamble sequence is repeated for a long period of time, movement of the satellite base station causes an increase or a decrease of a communication delay, and consequently, the preamble sequence received by the satellite base station is misplaced. A maximum time synchronization drift of the TA that can be reached by repeating 64 times is ±1200 Ts, where Ts is a sampling time interval. For example, a length of Ts may be 0.509×64 nanoseconds (ns).

For another example, for the uplink data, a precision requirement of the NB IoT for time synchronization is ±13.33 Ts. If the terminal transmits for 256 ms without performing time adjustment, a maximum error generated by the terminal reaches ±384 Ts. This far exceeds the precision requirement for time synchronization. An extremely large TA change caused in 256 ms affects data coding.

To resolve these problems, an embodiment of this application provides an uplink signal sending and receiving method. A time interval is inserted in an uplink signal (for example, a preamble sequence or uplink data) transmission process, to compensate for a time synchronization drift generated between a satellite base station and a terminal. This enhances signal receiving strength of the satellite base station, and improves coding performance of the satellite base station. The method provided in this application may be applied between a first communication apparatus and a second communication apparatus. The first communication apparatus may be a terminal, the second communication apparatus may be a satellite base station, and the first communication apparatus and the second communication apparatus may alternatively be other devices, to resolve a similar problem in a corresponding scenario (for example, a scenario of uncrewed aerial vehicle communication or hot air balloon communication). This application is described below by using an example in which the first communication apparatus and the second communication apparatus are respectively the terminal and the satellite base station. It may be understood that the terminal in the following may alternatively be replaced with the first communication apparatus, and the satellite base station may alternatively be replaced with the second communication apparatus.

During specific implementation of this application, only the terminal may compensate for a time synchronization drift, or both the terminal and the satellite base station may compensate for the time synchronization drift. The following separately provides descriptions by using Embodiment 1 and Embodiment 2.

Embodiment 1

Figure 9:
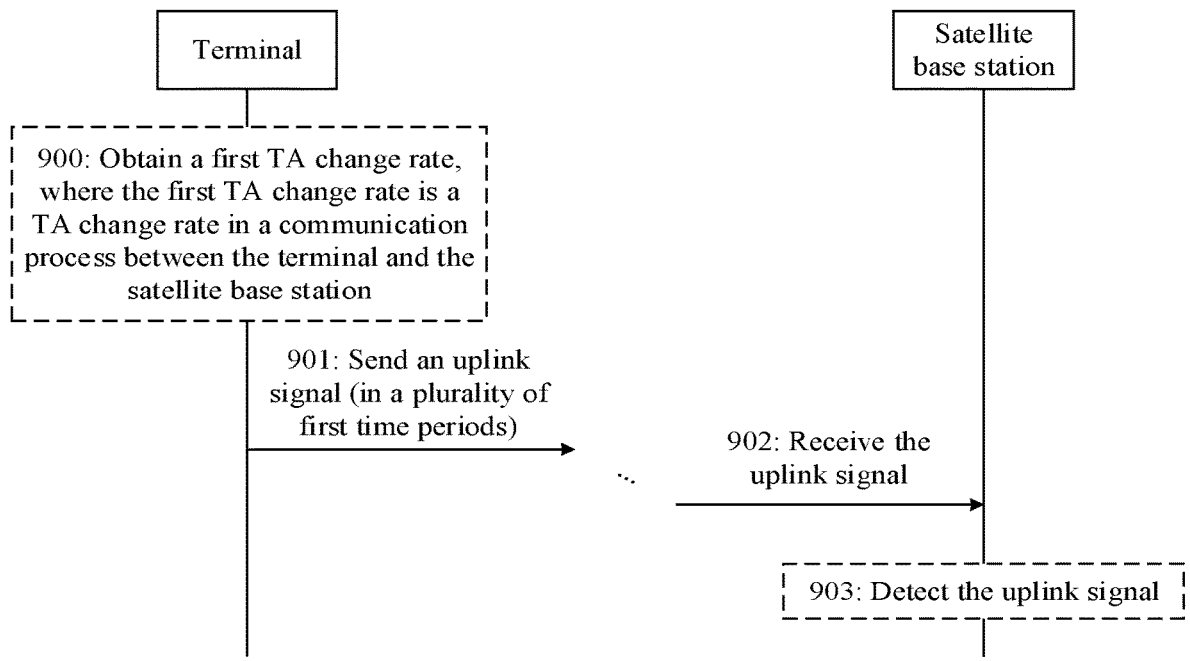
FIG. 9 is a flowchart of an uplink signal sending and receiving method according to an embodiment of this application.

In Embodiment 1, only a terminal compensates a time synchronization drift, and this is applicable to a case in which a TA change rate is negative. Refer to FIG. 9. An uplink signal sending and receiving method provided in Embodiment 1 includes the following steps.

901: The terminal sends an uplink signal in a plurality of first time periods, and there is a first time interval between the plurality of first time periods.

Figure 10:
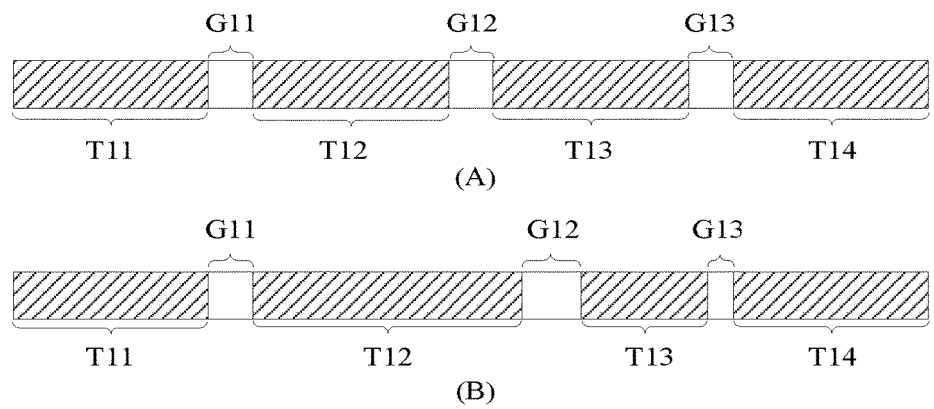
FIG. 10 is a schematic diagram of a first time period and a first time interval according to an embodiment of this application.

The terminal may be any terminal in terminals served by a satellite base station. Lengths of different first time periods in the plurality of first time periods may be the same (for example, (A) in FIG. 10) or may be different (for example, (B) in FIG. 10), and lengths of different first time intervals between the plurality of first time periods may be the same (for example, (A) in FIG. 10) or may be different (for example, (B) in FIG. 10). This is not limited in this application. Optionally, the first time interval is used to compensate for a time synchronization drift between the terminal and the satellite base station, or is used to compensate for a time synchronization drift between the terminal and a terrestrial station.

Optionally, the first time period is one or more slots, in other words, the terminal may insert one first time interval at an interval of the one or more slots. The first time period is one or more subframes, in other words, the terminal may insert one first time interval at an interval of the one or more subframes. The first time period is duration required for sending one or more preamble sequences, in other words, the terminal may insert one first time interval at an interval of the duration required for sending one or more preamble sequences. The first time period may alternatively be another time unit. This is not limited in this application.

Optionally, the uplink signal is a preamble sequence or uplink data. Optionally, the uplink signal sent in the plurality of first time periods includes a repeated signal. For example, the uplink signal includes a repeated preamble sequence group or includes repeated uplink data. A time period (a total time period described in this application) between a start time point of a 1$^{st}$ first time period and an end time point of a last first time period of the plurality of first time periods may be a part or all of the foregoing transmission duration X. For the preamble sequence, X is set to: 64×duration of the preamble sequence group. For the uplink data, X is set to 256 ms. X may alternatively be set to another value. This is not limited in this application.

Optionally, the first time interval occurs periodically, and a location of the first time interval between the plurality of first time periods is determined based on duration of the first time interval. For example, the duration may be one or more slots, one or more subframes, duration required for sending one or more preamble sequences, or the like. This is not limited in this application. Certainly, the first time interval may not occur periodically. The duration of the first time interval may alternatively be a timer, a timer period, a discontinuous reception (discontinuous reception, DRX) period, or the like.

Figure 11:
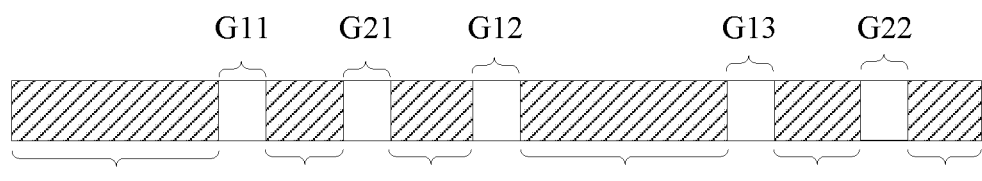
FIG. 11 is a schematic diagram of a first time period, a first time interval, and a second time interval according to an embodiment of this application.
Figure 11:
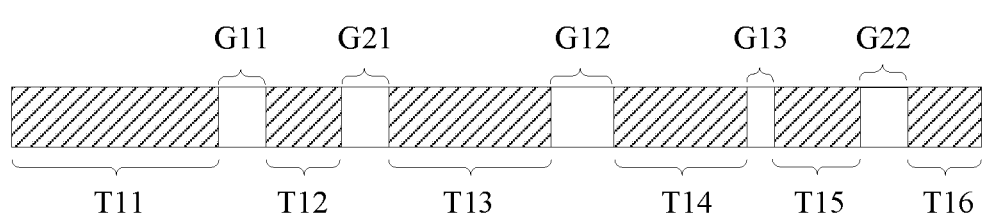

Optionally, there is a second time interval between the plurality of first time periods, and the second time interval is used to receive system information of the satellite base station. The terminal does not perform uplink sending in the second time interval, duration of the second time interval is the same as duration in which the satellite base station sends the system information (for example, a system information block 1 (SIB 1)) or system information related to a satellite communication parameter), and a length of the second time interval is greater than or equal to a length of a time domain resource occupied by the corresponding system information. For example, refer to (A) in FIG. 11 and (B) in FIG. 11. In this case, there is not only the first time interval but also the second time interval between the plurality of first time periods.

The system information may include at least one type of information such as a satellite ephemeris, satellite coordinates, a TA change rate, a time sequence offset, and a Doppler compensation value. The information may assist the terminal in determining the first time interval, so that the terminal compensates for the time synchronization drift.

It should be noted that one second time interval and one first time interval may partially or completely overlap, or may be consecutive in time domain. This is not limited in this application.

Figure 12:
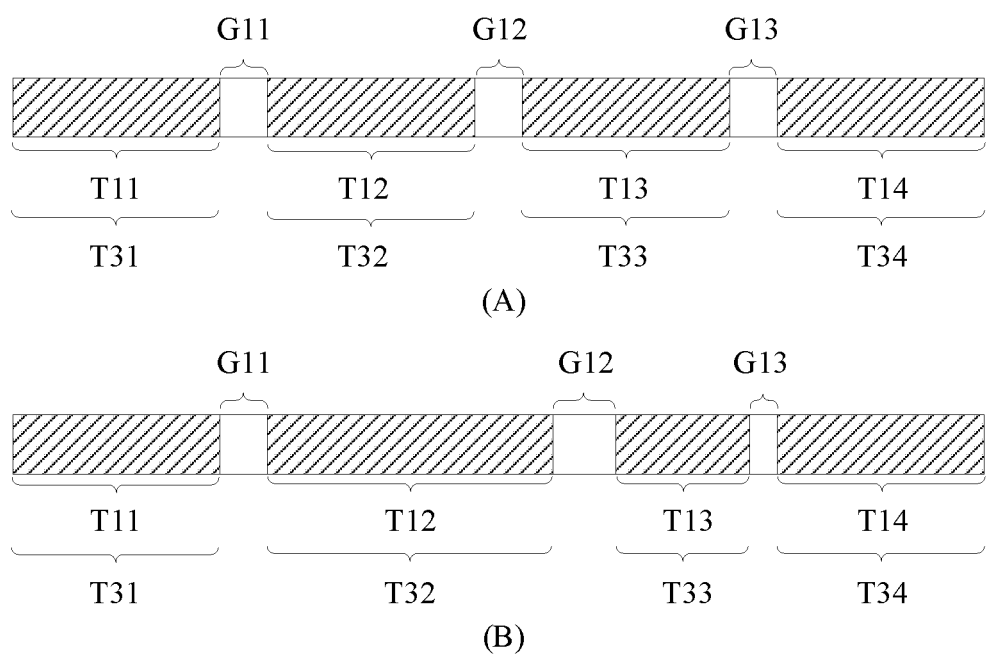
FIG. 12 is a schematic diagram of a first time period, a third time period, and a first time interval according to an embodiment of this application.
Figure 13:
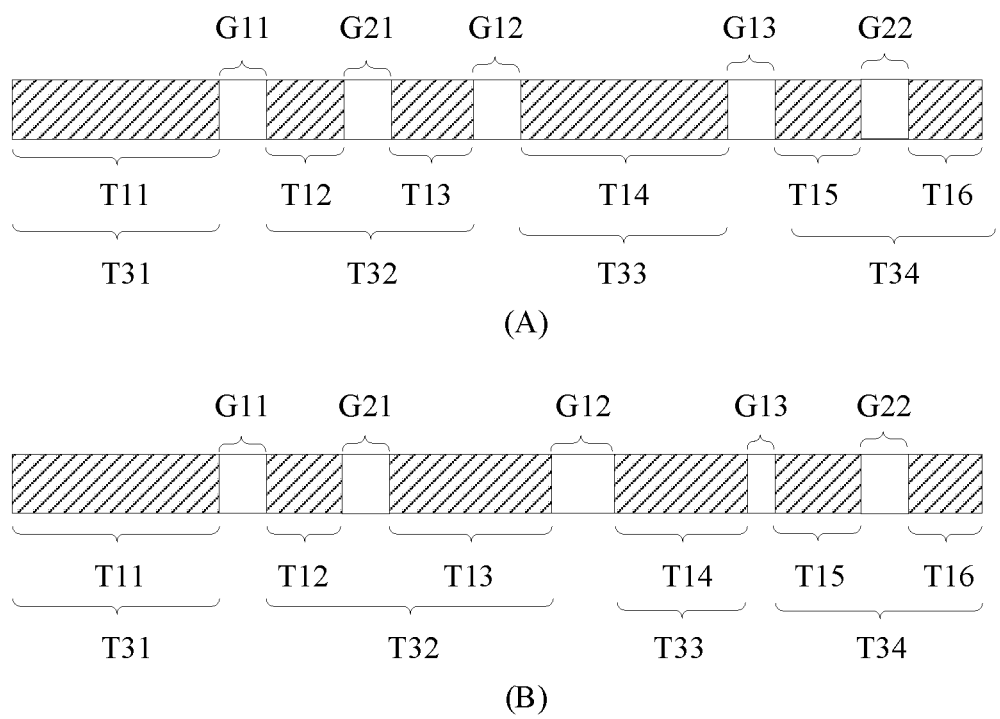
FIG. 13 is a schematic diagram of a first time period, a first time interval, a third time period, and a second time interval according to an embodiment of this application.

For ease of description, in this application, a time period between every two adjacent first time intervals is denoted as a third time period. In the total time period, a time period before a 1$^{st}$ first time interval and a time period after a last first time interval each are one third time period. It can be understood that, when there is only the first time interval between the plurality of first time periods, the first time period is the same as the third time period; and when there is not only the first time interval but also the second time interval between the plurality of first time periods, a quantity of third time periods does not exceed a quantity of first time periods. For example, based on an example shown in FIG. 10, for each third time period, refer to FIG. 12; and based on an example shown in FIG. 11, for each third time period, refer to FIG. 13.

Optionally, in the first time interval, the terminal does not perform uplink sending, that is, the first time interval is a UP GAP; or in the first time interval, the terminal sends a CS of a signal. A CS sent in each first time interval is a CS of an uplink signal sent in a third time period that is before the first time interval and adjacent to the first time interval. For example, based on the examples shown in FIG. 12 and FIG. 13, a CS sent in G12 is a CS of an uplink signal sent in T32.

It should be noted that other information, for example, a cyclic prefix (CP), may be further transmitted in the first time interval. This is not limited in this application. In addition, in the plurality of first time intervals, uplink sending may not be performed in some first time intervals, and a CS of an uplink signal may be sent in some first time intervals. In each of a first time interval corresponding to the uplink data and a first time interval corresponding to the preamble sequence, uplink sending may not be performed, or the CS may be sent. Alternatively, uplink sending may not be performed in the first time interval corresponding to the uplink data, and the CS is sent in the first time interval corresponding to the preamble sequence. Alternatively, the CS may be sent in the first time interval corresponding to the uplink data, and uplink sending is not performed in the first time interval corresponding to the preamble sequence.

902: The satellite base station receives the uplink signal from the terminal.

Optionally, refer to FIG. 9. Before the step 901, the method further includes the following step.

900: The terminal obtains a first TA change rate, and the first TA change rate is a TA change rate in a communication process of the terminal. In this case, the length of the first time interval and the location of the first time interval between the plurality of first time periods are determined based on the first TA change rate.

The first TA change rate may be any one of the following:
(1) a TA change rate (for example, the TA change rate shown in FIG. 6) in a communication process between the terminal and the satellite base station;
(2) a TA change rate (for example, a TA change rate in a time period in FIG. 6) in a communication process between the terminal and the satellite base station;
(3) a TA change rate at a spatial distance (denoted as a first spatial distance) in a communication process between the terminal and the satellite base station;
(4) a TA change rate in a communication process between the terminal and the terrestrial station, where the TA change rate may be a sum of a TA change rate in a communication process between the terminal and the satellite base station and a TA change rate between the satellite base station and the terrestrial station; or
(5) a TA change rate at a second spatial distance, where the second spatial distance includes a spatial distance between the terminal and the satellite base station and a spatial distance between the satellite base station and the terrestrial station.

When the first TA change rate is (1) and (2), the terminal compensates for a time synchronization drift of a service link (from the terminal to the satellite), and the satellite base station compensates for a time synchronization drift of a feeder link (from the satellite to the terrestrial station). When the first TA change rate is (3), the terminal compensates for time synchronization drifts of some service links (from the terminal to the satellite), and the satellite base station compensates for time synchronization drifts of remaining service links and a feeder link (from the satellite to the terrestrial station). When the first TA change rate is (4), the terminal compensates for time synchronization drifts of a service link (from the terminal to the satellite) and a feeder link (the satellite to the terrestrial station). When the first TA change rate is (5), the terminal compensates for time synchronization drifts of a service link (from the terminal to the satellite) and some feeder links (from the satellite to the terrestrial station), and the satellite base station compensates for remaining time synchronization drifts.

Optionally, when the first TA change rate is (1) or (2), the step 900 may be implemented in the following Manner A or Manner B.

Manner A: The terminal determines the first TA change rate based on geographical location information of the terminal and location information of the satellite base station.

In Manner A, the terminal has a global navigation satellite system (GNSS), and may position the terminal. The location information of the satellite base station may be determined based on the satellite ephemeris, and the satellite ephemeris may be sent by the satellite base station to the terminal. In Manner A, the first TA change rate may be specifically calculated by using the TA change rate calculation manner described above. When the uplink signal is the preamble sequence, the terminal may obtain the first TA change rate before random access. When the uplink signal is the uplink data, the terminal may obtain the first TA change rate before random access, or may obtain the first TA change rate after accessing the satellite base station.

Manner B: The terminal receives the first TA change rate from the satellite base station. In this case, the satellite base station sends the first TA change rate to the terminal. Specifically, the first TA change rate may be carried on a broadcast channel, or may be carried on a data channel or a control channel. The first TA change rate may be at a cell level, may be at a beam level, or may be at a user level.

Locations of different terminals relative to the satellite base station are different, when the first TA change rate is obtained in Manner A, first TA change rates obtained by the different terminals are also different. Therefore, lengths and locations of first time intervals that are determined by terminals based on first TA change rates may also be different, and the first time interval may be understood as a first time interval at a terminal level. In this case, compensation for a time synchronization drift is more accurate. However, in Manner B, the terminal may directly obtain the first TA change rate from the satellite base station, and does not need to perform calculation. Therefore, complexity of the terminal can be reduced.

When the first TA change rate is (3), the terminal may also obtain the first TA change rate in the foregoing Manner A or Manner B. A difference lies in that, in Manner A, the spatial distance for calculating the TA change rate is no longer a distance between the terminal and the satellite base station, but the first spatial distance.

When the first TA change rate is (4), the TA change rate in the communication process between the terminal and the satellite base station may be determined in Manner A or Manner B. The TA change rate between the satellite base station and the terrestrial station may be indicated by the satellite base station to the terminal. The terminal may determine the first TA change rate based on the TA change rate in the communication process between the terminal and the satellite base station and the TA change rate between the satellite base station and the terrestrial station. Alternatively, the first TA change rate may be directly indicated by a network device to the terminal.

When the first TA change rate is (5), the TA change rate in the communication process between the terminal and the satellite base station may be determined in Manner A or Manner B. A TA change rate between the satellite and the terrestrial station compensated by the terminal may be indicated by the satellite base station to the terminal. The terminal may determine the first TA change rate based on the TA change rate in the communication process between the terminal and the satellite base station and the TA change rate indicated by the satellite. Alternatively, the first TA change rate may be directly indicated by a network device to the terminal.

Optionally, refer to FIG. 9. After the step 902, the method further includes the following step.

903: The satellite base station detects the uplink signal.

By performing the step 903, the satellite base station may obtain information in the uplink signal. For the uplink data, the satellite base station may obtain data information through demodulation and coding. For the preamble sequence, the satellite base station may perform correlation detection on the preamble sequence.

According to the method provided in this embodiment of this application, when sending the uplink signal, the terminal may insert the first time interval between time periods in which the uplink signal is sent, to compensate for a time synchronization drift. This reduces impact of the time synchronization drift caused by movement of the satellite base station on uplink signal detection performance of the satellite base station, and improves coding performance of the satellite base station.

To make Embodiment 1 clearer, the following describes a technical solution in Embodiment 1 by using Case 1 (there is only the first time interval between the plurality of first time periods) and Case 2 (there is not only the first time interval but also the second time interval between the plurality of first time periods). In addition, for ease of description, the method provided in Embodiment 1 is described by using an example in which the first TA change rate is the TA change rate in the communication process between the terminal and the satellite base station in this application. When the first TA change rate is another case, a principle is the same. For details, refer to the foregoing descriptions for understanding.

Case 1: There is only the first time interval between the plurality of first time periods.

In Case 1, the third time period is the same as the first time period.

In Case 1, optionally, the length of the first time interval is greater than or equal to a TA change amount (denoted as a first TA change amount) in a communication process between the terminal and the satellite base station in the first time period that is before the first time interval and adjacent to the first time interval. It should be noted that the length of the first time interval may alternatively be less than the first TA change amount, or the length of the first time interval is a fixed value. In this case, the time synchronization drift can be compensated for.

The first TA change amount may be determined based on the first TA change rate. For example, the first TA change amount may be a product of a TA change rate in the first TA change rate and a length of the first time period that is before the first time interval and adjacent to the first time interval. The TA change rate may be a TA change rate at a start time point or an end time point of the first time period that is before the first time interval and adjacent to the first time interval, or a TA change rate at a middle time point of the first time period, or may be an average value of TA change rates in the first time period that is before the first time interval and adjacent to the first time interval. This is not limited in this application.

The length of the first time interval is related to the length of the first time period. Specifically, a shorter first time period may indicate a shorter first time interval, and vice versa.

The first time interval is the UP GAP, or the first time interval is used to transmit the CS. The following provides an example of the first time interval by using Case 1.1 (the first time interval is the UP GAP) and Case 1.2 (the first time interval is used to transmit the CS).

Case 1.1: The first time interval is the UP GAP.

Figure 14:
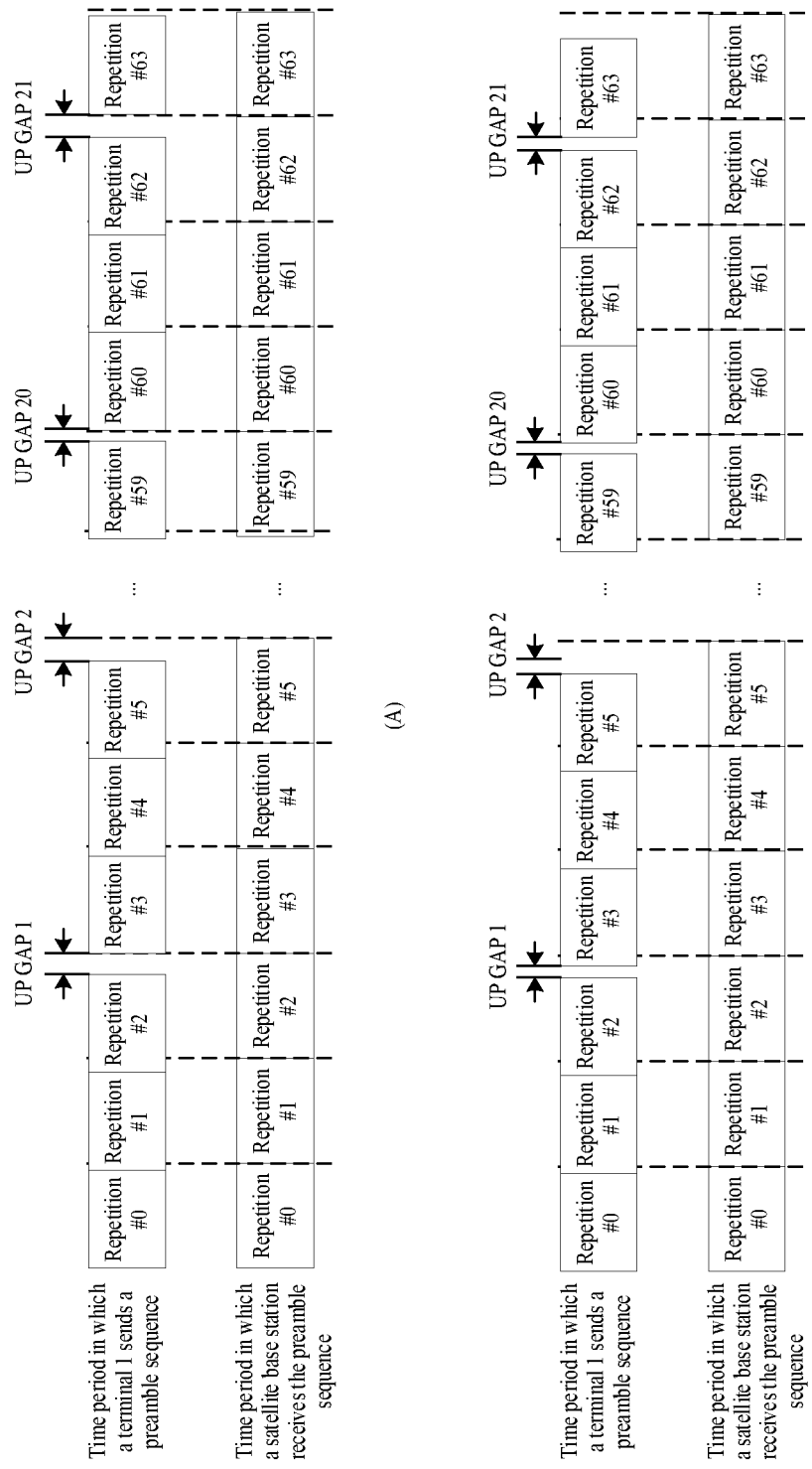
FIG. 14 is a schematic diagram of inserting a UP GAP between a preamble sequence group by a terminal according to an embodiment of this application.

For example, as shown in (A) in FIG. 14 and (B) in FIG. 14, when the uplink signal is the preamble sequence, there is a negative TA change rate between a terminal 1 and the satellite base station. In this case, the terminal 1 may insert the UP GAP between repeated preamble sequence groups. In the UP GAP, the terminal 1 suspends sending the preamble sequence group, and continues to send the preamble sequence group after the UP GAP ends. For example, the terminal 1 may insert one UP GAP every time three preamble sequence groups are sent, and a length of the UP GAP may be a TA change amount generated when the three preamble sequence groups are sent, to compensate for a time synchronization drift. For example, a length of a UP GAP 1 may be a TA change amount generated by a sending repetition #0, a sending repetition #1, or a sending repetition #2. (A) in FIG. 14 shows compensation for a time synchronization drift performed by the terminal 1 based on the first TA change rate determined based on geographical location information of the terminal 1 and the location information of the satellite base station, so that the time synchronization drift can be more accurately compensated for. (B) in FIG. 14 shows compensation for a time synchronization drift performed by the terminal 1 based on the first TA change rate delivered by the satellite base station.

Figure 15:
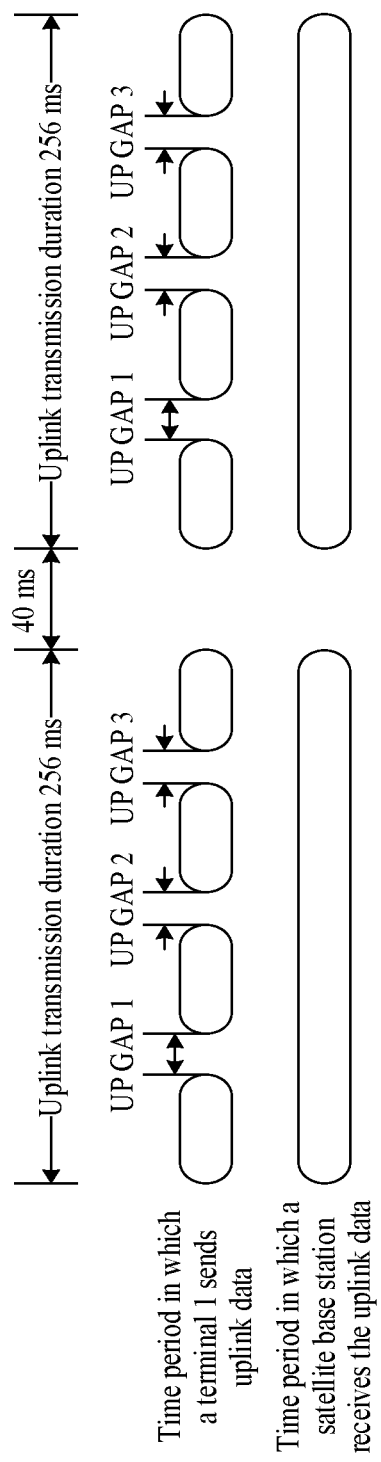
FIG. 15 is a schematic diagram of inserting a UP GAP between uplink data by a terminal according to an embodiment of this application.

For example, as shown in FIG. 15, when the uplink signal is uplink data, within uplink transmission duration 256 ms, the terminal 1 may insert the UP GAP in an uplink transmission process based on the first TA change rate, to compensate for a time synchronization drift.

In Case 1.1, the satellite base station may receive and detect the uplink signal based on an existing uplink signal receiving and detection process.

Case 1.2: The first time interval is used to transmit the CS.

It should be noted that, in Case 1.2, a CS corresponding to the first time period may also be sent after a last first time period.

Figure 16:
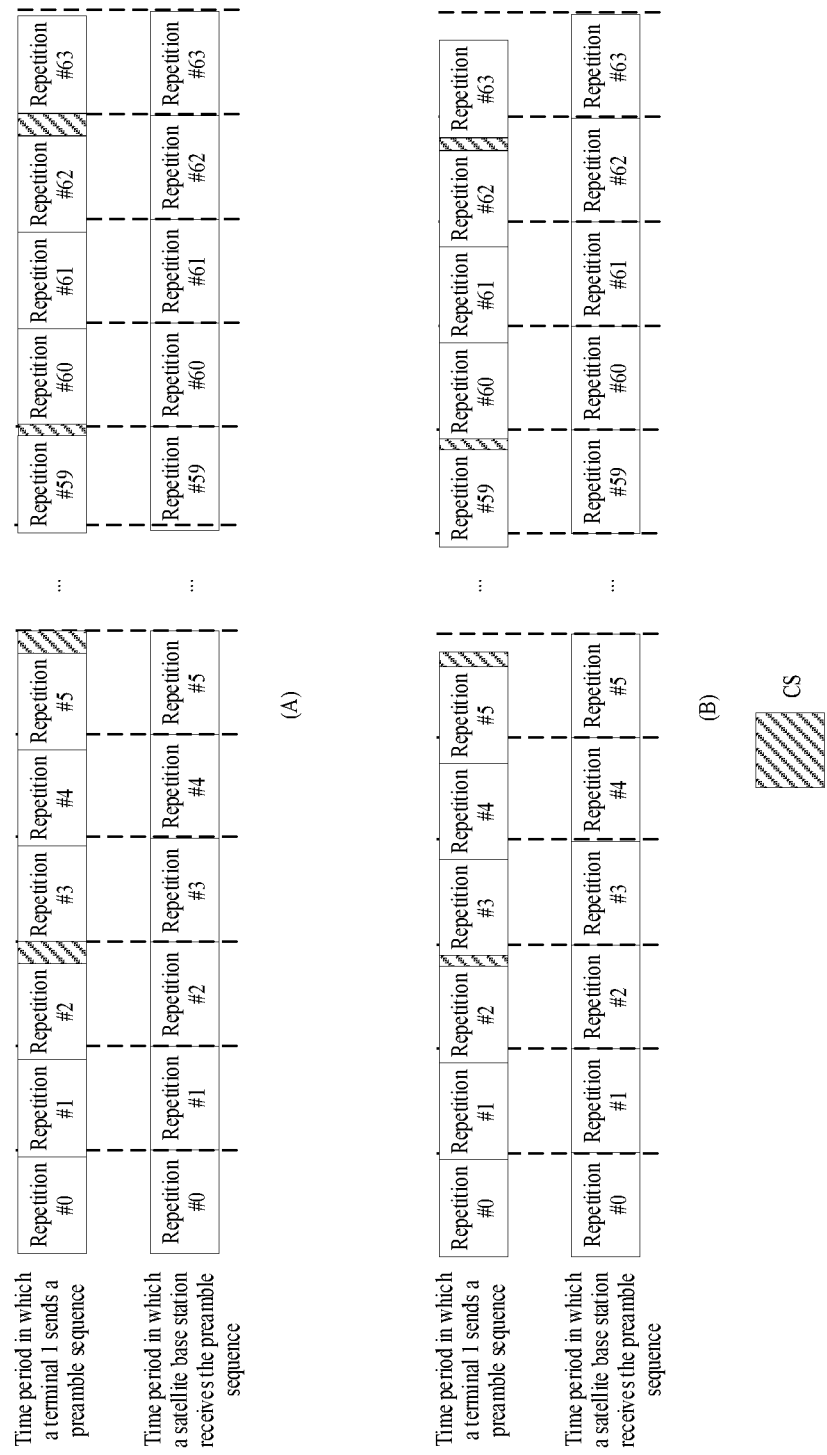
FIG. 16 is a schematic diagram of inserting a CS between preamble sequence groups by a terminal according to an embodiment of this application.

For example, as shown in (A) in FIG. 16 and (B) in FIG. 16, when the uplink signal is the preamble sequence, there is a negative TA change rate between a terminal 1 and the satellite base station. In this case, the terminal 1 may insert the CS between repeated preamble sequence groups. For example, the terminal 1 may insert one CS every time three preamble sequence groups are sent, and a length of the CS may be a TA change amount generated when the three preamble sequence groups are sent, to compensate for a time synchronization drift. For example, a length of a CS 1 may be a TA change amount generated by a sending repetition #0, a sending repetition #1, and a sending repetition #2. (A) in FIG. 16 shows compensation for a time synchronization drift performed by the terminal 1 based on the first TA change rate determined based on geographical location information of the terminal 1 and the location information of the satellite base station, so that the time synchronization drift can be more accurately compensated for. (B) in FIG. 16 shows compensation for a time synchronization drift performed by the terminal 1 based on the first TA change rate delivered by the satellite base station.

Figure 17:
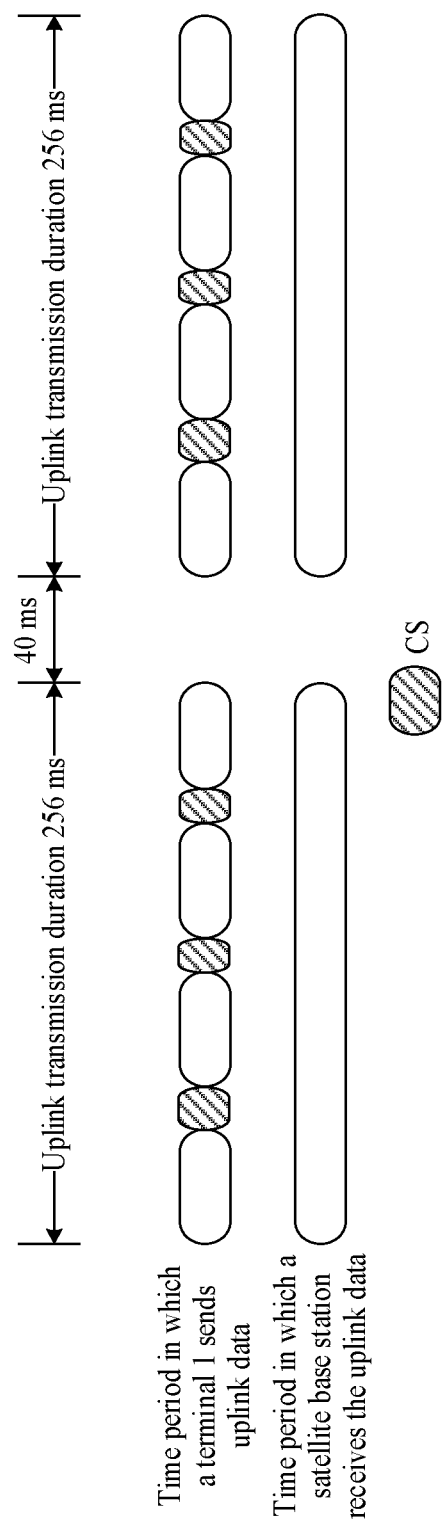
FIG. 17 is a schematic diagram of inserting a CS between uplink data by a terminal according to an embodiment of this application.

For example, when the uplink signal is uplink data, refer to FIG. 17. Within uplink transmission duration 256 ms, the terminal 1 may insert the CS in an uplink transmission process based on the first TA change rate, to compensate for a time synchronization drift.

In Case 1.2, after detecting the uplink signal, the satellite base station may remove the CS, to obtain a required uplink signal. Specifically, after receiving the uplink signal, the satellite base station may determine, according to some algorithms, which part of the signal is the CS, and remove the CS after determining the CS, to obtain the required uplink signal. For the preamble sequence, after obtaining the plurality of preamble sequences, the satellite base station may combine the obtained preamble sequences.

In Case 1, the terminal may determine the length of the first time interval and the location of the first time interval between the plurality of first time periods in any one of the following Manner 1 to Manner 3.

Manner 1: The terminal determines the location of the first time interval between the plurality of first time periods, and calculates the length of the first time interval based on the first TA change rate.

During actual implementation, when determining the location of the first time interval between the plurality of first time periods, the terminal may first determine the location of the first time interval, and then obtain the plurality of first time periods through segmentation. For example, if the terminal determines to insert one first time interval at an interval of one slot, each first time period is one slot. Alternatively, the terminal may first determine the length of the first time period, to determine the location of the first time interval. For example, if the terminal determines that one first time interval is inserted at an interval of duration required for three preamble sequence groups, one first time interval is inserted into every three preamble sequence groups.

The location of the first time interval or the length of the first time period may be indicated by the satellite base station to the terminal, or may be determined by the terminal, or may be preset or specified in a protocol. After determining the location of the first time interval or the length of the first time period, the terminal may determine a TA change amount in each first time period based on the first TA change rate, or directly calculate a TA change amount in each first time period based on a distance between the terminal and the satellite base station in a movement process, and insert the first time interval after the first time period. The first time interval may be greater than or equal to the TA change amount.

For a process of determining the TA change amount in each first time period based on the first TA change rate, refer to the foregoing description. Details are not described again.

A process of directly calculating the TA change amount in each first time period based on the distance between the terminal and the satellite base station in the movement process may be that: The terminal obtains a movement track of the satellite base station, and determines a distance L1 between the terminal and the satellite base station at the start time point of the first time period and a distance L2 between the terminal and the satellite base station at the end time point of the first time period. In this case, the TA change amount corresponding to the first time period is $|2\times(L2-L1)/C|$. "$|\text{-}|$" indicates taking an absolute value.

Manner 2: The terminal stores a correspondence (denoted as a first correspondence) among a TA change rate, a length of a time interval, and a location of the time interval between the plurality of first time periods. The terminal determines the length of the first time interval and the location of the first time interval between the plurality of first time periods from the first correspondence based on the first TA change rate.

The first correspondence may be indicated by the satellite base station to the terminal, or may be preset or specified in a protocol. The first correspondence may be represented in a form of a table. The first correspondence may include a plurality of time interval formats. Each time interval format corresponds to a length of one time interval and a location of the time interval between the plurality of first time periods.

During specific implementation of Manner 2, the terminal may determine the TA change rate of the terminal in the total time period based on the first TA change rate. For example, based on the example shown in FIG. 6, if the total time period is 500 ms, and a start time point of 500 ms is a $70^{th}$ s, the total time period is from 70 s to 70.5 s. In this case, the TA change rate of the terminal in the total time period may be determined based on FIG. 6. The TA change rate of the terminal in the total time period may be a TA change rate at a start time point or an end time point of the total time period, or a TA change rate at a middle time point of the total time period, or may be an average value of TA change rates in the total time period. In this case, if the TA change rate of the terminal in the total time period is 0.028, the first correspondence is shown in Table 1, and a UP GAP format (that is, a format when the time interval is the UP GAP) is a UP GAP format 2. It can be learned from Table 1 that the terminal inserts a first time interval whose length is 50 Ts every time the terminal sends four repeated preamble sequence groups.

TABLE 1

| Absolute value of a TA change rate | UP GAP format 2 | UP GAP format 1 | UP GAP format 0 |
| --- | --- | --- | --- |
| 0 | 0 | 0 | 0 |
| 0 to 0.01 ms/s | 12 Ts/4 repetitions | 12 Ts/10 repetitions | 12 Ts/8 repetitions |
| 0.01 to 0.02 ms/s | 25 Ts/4 repetitions | 25 Ts/10 repetitions | 25 Ts/8 repetitions |
| 0.02 to 0.03 ms/s | 50 Ts/4 repetitions | 50 Ts/10 repetitions | 50 Ts/8 repetitions |
| 0.03 to 0.04 ms/s | 100 Ts/4 repetitions | 100 Ts/10 repetitions | 100 Ts/8 repetitions |
| 0.04 to 0.05 ms/s | 200 Ts/4 repetitions | 200 Ts/10 repetitions | 200 Ts/8 repetitions |

It should be noted that the terminal may not determine the length of the first time interval and the location of the first time interval between the plurality of first time periods from the first correspondence based on the first TA change rate, but receive the TA change rate of the terminal in the total time period determined by the satellite base station, and then obtain the length of the first time interval and the location of the first time interval between the plurality of first time periods by querying a table.

Manner 3: The terminal receives second indication information from the satellite base station. The second indication information indicates a first index, and the first index indicates the length of the time interval and the location of the time interval between the plurality of first time periods. The terminal determines that the length of the time interval corresponding to the first index and a location of the time interval between the plurality of first time periods are respectively the length of the first time interval and the location of the first time interval between the plurality of first time periods.

The terminal may store a correspondence (denoted as a second correspondence) among an index, a length of a time interval, and a location of the time interval between the plurality of first time periods. The second correspondence may be indicated by the satellite base station to the terminal, or may be preset or specified in a protocol. The second correspondence may be represented in a form of a table. The second correspondence may include a plurality of time interval formats.

In Manner 3, the satellite base station sends the second indication information to the terminal. The second indication information may be carried in broadcast information. Before sending the second indication information, the satellite base station may determine the first index. For example, the satellite base station may determine a TA change rate of the terminal in the total time period based on the first TA change rate, and determine the first index based on the TA change rate of the terminal in the total time period. There may be a correspondence between the TA change rate and the index, and the index may be determined after the TA change rate is determined.

For example, if the second correspondence is shown in Table 2, the first index indicated by the second indication information is 3, and a UP GAP format is a UP GAP format 2. It can be learned from Table 2 that the terminal inserts a first time interval whose length is 50 Ts every time the terminal sends four repeated preamble sequence groups.

TABLE 2

| Index | UP GAP format 2 | UP GAP format 1 | UP GAP format 0 |
| --- | --- | --- | --- |
| 0 | 0 | 0 | 0 |
| 1 | 12 Ts/4 repetitions | 12 Ts/10 repetitions | 12 Ts/8 repetitions |
| 2 | 25 Ts/4 repetitions | 25 Ts/10 repetitions | 25 Ts/8 repetitions |
| 3 | 50 Ts/4 repetitions | 50 Ts/10 repetitions | 50 Ts/8 repetitions |

TABLE 2-continued

| Index | UP GAP format 2 | UP GAP format 1 | UP GAP format 0 |
| --- | --- | --- | --- |
| 4 | 100 Ts/4 repetitions | 100 Ts/10 repetitions | 100 Ts/8 repetitions |
| 5 | 200 Ts/4 repetitions | 200 Ts/10 repetitions | 200 Ts/8 repetitions |

In an alternative implementation of Manner 3, the satellite base station may directly indicate the length and the duration of the first time interval (the duration herein may be a quantity of repeated preamble sequence groups, or may be a period of time).

In Manner 2 and Manner 3, the terminal may directly determine the length of the first time interval and the location of the first time interval between the plurality of first time periods based on an indication of the satellite base station and the correspondence. This can reduce complexity of the terminal.

Case 2: There is not only the first time interval but also the second time interval between the plurality of first time periods.

In Case 2, it should be noted that because the satellite base station is capable of simultaneously performing uplink sending and downlink sending, the second time interval is not required between a plurality of second time periods.

In Case 2, due to existence of the second time interval, a time synchronization drift may be partially compensated for. When the first time interval is inserted, the first time interval may be shorter, and a quantity of first time intervals may be smaller. When the second time interval and the first time interval are located between two same first time periods, the two time intervals may be combined and inserted as one time interval. For example, the two time intervals may be inserted as a long time interval. The two time intervals may not be combined and both are inserted. For example, based on an example shown in (B) in FIG. 11, if a second time interval is between T11 and T12, and a first time interval is also located between T11 and T12, a time interval between T11 and T12 may be a longer time interval in the two time intervals, or may be a sum of the two time intervals.

In Case 2, optionally, the length of the first time interval is greater than or equal to a TA change amount (denoted as a second TA change amount) in a communication process between the terminal and the satellite base station in a third time period that is before the first time interval and adjacent to the first time interval. It should be noted that the length of the first time interval may alternatively be less than the second TA change amount, or the length of the first time interval is a fixed value. In this case, the time synchronization drift can be compensated for.

The second TA change amount may be determined based on the first TA change rate. For example, the second TA change amount may be a product of a TA change rate in the first TA change rate and a length of the third time period that is before the first time interval and adjacent to the first time interval. The TA change rate may be a TA change rate at a start time point or an end time point of the third time period that is before the first time interval and adjacent to the first time interval, or a TA change rate at a middle time point of the third time period, or may be an average value of TA change rates in the third time period that is before the first time interval and adjacent to the first time interval. This is not limited in this application.

The length of the first time interval is related to the length of the third time period. Specifically, a shorter third time period may indicate a shorter first time interval, and vice versa.

The first time interval is the UP GAP, or the first time interval is used to transmit the CS. The following provides an example of the first time interval and the second time interval by using Case 2.1 (the first time interval is the UP GAP) and Case 2.2 (the first time interval is used to transmit the CS).

Case 2.1: The first time interval is the UP GAP.

Figure 18:
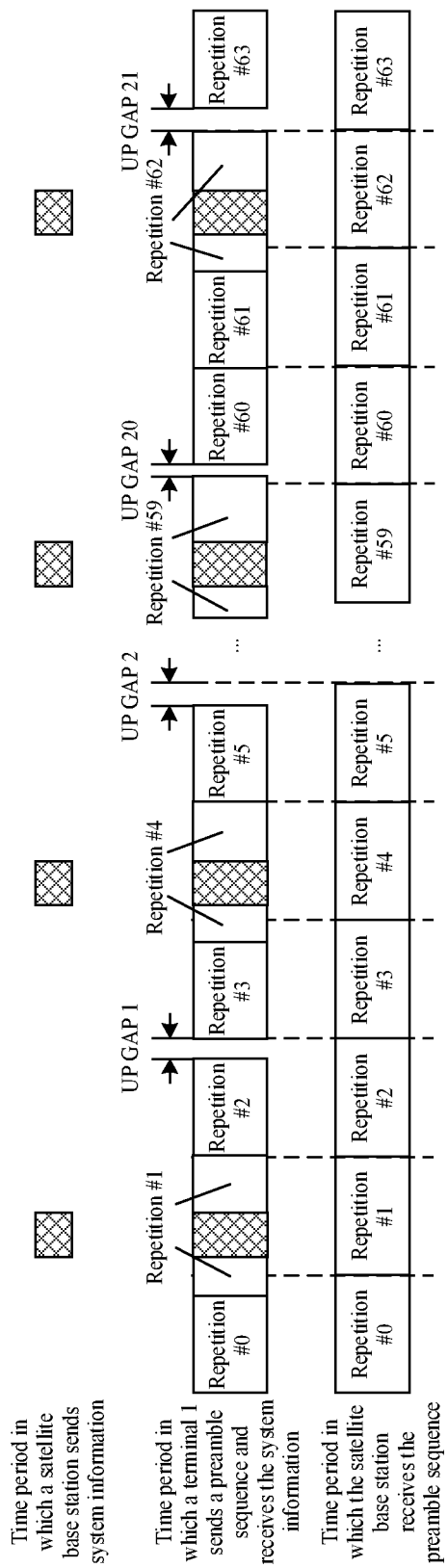
FIG. 18 is a schematic diagram of inserting a UP GAP and a second time interval between a preamble sequence group by a terminal according to an embodiment of this application.

For example, as shown in FIG. 18, when the uplink signal is the preamble sequence, there is a negative TA change rate between a terminal 1 and the satellite base station. In this case, the terminal 1 may insert the UP GAP between repeated preamble sequence groups, and insert the second time interval based on sending duration of the system information and a length of the system information. In the UP GAP, the terminal 1 suspends sending the preamble sequence group, and continues to send the preamble sequence group after the UP GAP ends. In the second time interval, the terminal 1 suspends sending the preamble sequence group, and receives the system information. For example, the terminal 1 may insert one UP GAP every time three preamble sequence groups are sent, and a length of the UP GAP may be a TA change amount generated in a time period between a start time point and an end time point for sending the three preamble sequence groups, to compensate for a time synchronization drift. For example, a length of a UP GAP 1 may be a TA change amount generated in a time period between a start time point of a sending repetition #0 and an end time point of a sending repetition #2. Similar to FIG. 14, the terminal 1 may compensate for a time synchronization drift based on a first TA change rate that is determined based on geographical location information of the terminal 1 and location information of the satellite base station, to compensate for a time synchronization drift more accurately, or may compensate for a time synchronization drift based on a first TA change rate delivered by the satellite base station. For details, refer to the foregoing description for understanding. Details are not described again.

Figure 19:
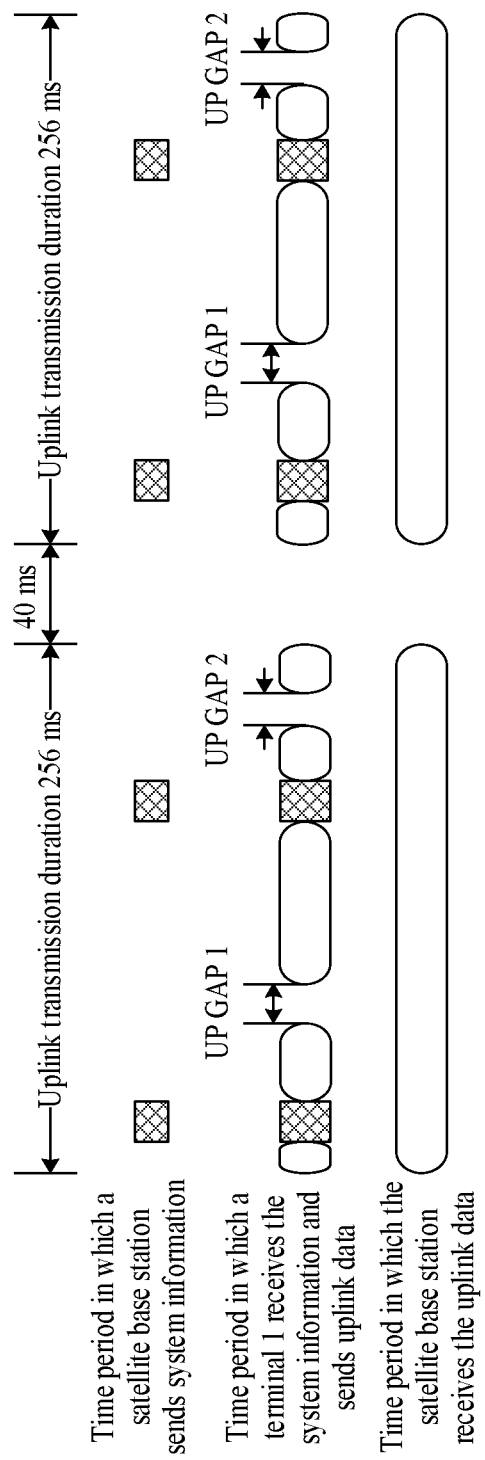
FIG. 19 is a schematic diagram of inserting a UP GAP and a second time interval between uplink data by a terminal according to an embodiment of this application.

For example, as shown in FIG. 19, when the uplink signal is uplink data, within uplink transmission duration 256 ms, the terminal 1 may insert the UP GAP in an uplink transmission process based on the first TA change rate, and insert the second time interval based on sending duration of the system information and a length of the system information, to compensate for a time synchronization drift.

In Case 2.1, the satellite base station may receive and detect the uplink signal based on an existing uplink signal receiving and detection process.

Case 2.2: The first time interval is used to transmit the CS.

It should be noted that, in Case 2.2, a CS corresponding to the third time period may also be sent after a last third time period.

For example, when the uplink signal is the preamble sequence, there is a negative TA change rate between a terminal 1 and the satellite base station. In this case, a terminal 1 may insert a first time interval used to transmit the C S between repeated preamble sequence groups, and insert the second time interval based on sending duration of the system information and a length of the system information. In the first time interval, the terminal 1 sends the CS. In the second time interval, the terminal 1 suspends sending the preamble sequence group, and receives the system information. Specifically, a UP GAP in FIG. 18 may be understood as a CS.

For example, when the uplink signal is uplink data, within uplink transmission duration 256 ms, a terminal 1 may insert the first time interval in an uplink transmission process based on the first TA change rate, and insert the second time interval based on the sending duration of the system information and the length of the system information, to compensate for a time synchronization drift. Specifically, a UP GAP in FIG. 19 may be understood as a CS.

In Case 2.2, after detecting the uplink signal, the satellite base station may remove the CS, to obtain a required uplink signal. For a specific process, refer to the foregoing descriptions, and details are not described again. For the preamble sequence, after obtaining the plurality of preamble sequences, the satellite base station may combine the obtained preamble sequences.

In Case 2, the terminal may determine the length of the first time interval and a location of the first time interval between a plurality of third time periods in any one of the foregoing Manner 1 to Manner 3. Only the first time period needs to be replaced with the third time period for understanding. A difference lies in that due to existence of the second time interval, the terminal needs to determine the length of the third time period based on the second time interval.

Figure 2:
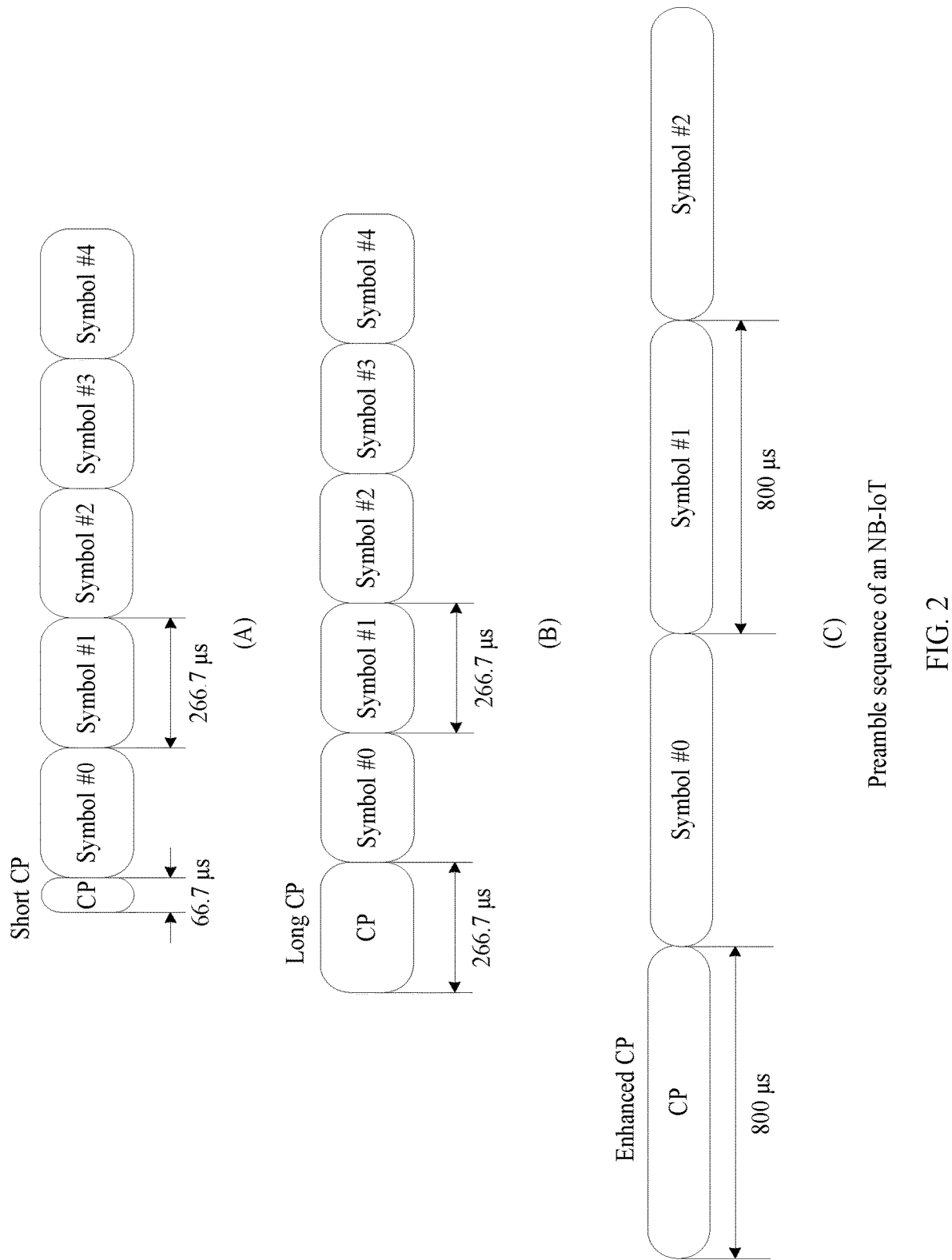
FIG. 2 is a schematic composition diagram of a preamble sequence according to an embodiment of this application.

In Embodiment 1, the length of the first time interval and the location of the first time interval between the plurality of first time periods may alternatively be determined based on the first TA change rate and a type of the uplink signal. The uplink data and the preamble sequence may be considered as different types of uplink signals, and preamble sequences with different CP lengths may also be considered as different types of uplink signals. As shown in FIG. 2, different preamble sequences have different lengths. Therefore, different types of uplink signals may correspond to different first correspondences and second correspondences. In this case, the length of the first time interval and the location of the first time interval between the plurality of first time periods may be determined from a corresponding correspondence based on each of different types of uplink signals.

Embodiment 2

Figure 20:
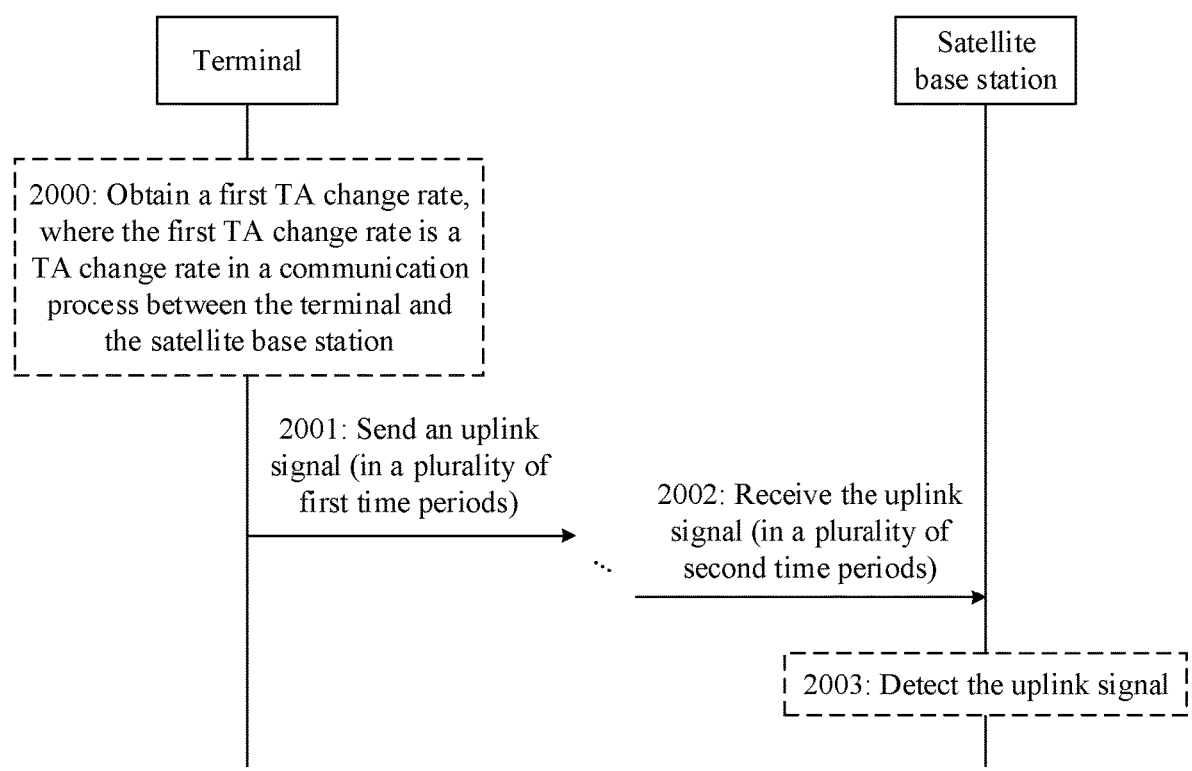
FIG. 20 is a flowchart of an uplink signal sending and receiving method according to an embodiment of this application.

In Embodiment 2, both a terminal and a satellite base station perform time synchronization drift compensation, and this is not only applicable to a case in which a TA change rate is negative, but also applicable to a case in which the TA change rate is positive. Refer to FIG. 20. An uplink signal sending and receiving method provided in Embodiment 2 includes the following steps.

2001: The terminal sends an uplink signal in a plurality of first time periods, and there is a first time interval between the plurality of first time periods.

Content described in the foregoing step 901 and the foregoing step 902 is applicable herein. Refer to the foregoing description, and details are not described again.

2002: The satellite base station receives the uplink signal from the terminal in a plurality of second time periods, and there is a third time interval between the plurality of second time periods.

A quantity of third time periods is the same as a quantity of second time periods, and a location of the third time interval between the plurality of second time periods is the same as a location of the first time interval between a plurality of third time periods.

Optionally, the third time interval is used to compensate a time synchronization drift between the terminal and the satellite base station, or is used to compensate a time synchronization drift between the terminal and a terrestrial station. That the location of the third time interval between the plurality of second time periods is the same as the location of the first time interval between the plurality of third time periods means that an $i^{th}$ third time interval is between a $j^{th}$ second time period and a $(j+1)^{th}$ second time period. In this case, an $i^{th}$ first time interval is between a $j^{th}$ third time period and a $(j+1)^{th}$ third time period. For example, the location of the third time interval between the plurality of second time periods may be understood with reference to the location of the first time interval between the plurality of third time periods in FIG. 12 and FIG. 13.

If the terminal does not perform uplink sending in the first time interval, the satellite base station does not receive the uplink signal from the terminal in the third time interval (in this case, the third time interval may be referred to as a BS GAP). Alternatively, if the terminal sends a CS of the uplink signal in the first time interval, the satellite base station receives the CS in the third time interval.

Similar to the first time interval, the third time interval may occur periodically, and the location of the third time interval between the plurality of second time periods is determined based on duration of the third time interval.

To align preamble sequence detection of all terminals as much as possible, the third time interval inserted by the satellite base station may be a maximum length that may be required, in other words, corresponds to a maximum TA change rate in a service area of the satellite base station. Then the terminal further performs adjustment based on a TA change rate of the terminal, to implement synchronization with the satellite base station. Therefore, the method may further include: The satellite base station obtains a second TA change rate, and the second TA change rate is the maximum TA change rate in a service area of the satellite base station; and the satellite base station determines a length of the third time interval and the location of the third time interval between the plurality of second time periods based on the second TA change rate. A process of determining the length of the third time interval and the location of the third time interval between the plurality of second time periods based on the second TA change rate is similar to a process of determining, by the terminal, the length of the first time interval and the location of the first time interval between the plurality of first time periods based on the first TA change rate in Case 1 of Embodiment 1. For details, refer to Embodiment 1 for understanding. Details are not described again. Similar to the first time interval in Embodiment 1, optionally, the length of the third time interval and the location of the third time interval between the plurality of second time periods are determined based on the second TA change rate and a type of the uplink signal.

The length of the third time interval and/or the location of the third time interval between the plurality of second time periods may alternatively be preset or specified in a protocol. This is not limited in this application.

Similar to the first time period, the second time period is one or more slots. Alternatively, the second time period is one or more subframes. Alternatively, the second time period is duration required for sending one or more preamble sequences.

Optionally, refer to FIG. 20. Before the step 2001, the method further includes step 2000. The step 2000 is the same as the step 900. For related descriptions, refer to the step 900. Details are not described again. Optionally, refer to FIG. 20. After the step 2002, the method further includes step 2003. The step 2003 is the same as the step 903. For related descriptions, refer to the step 903. Details are not described again.

According to the method provided in this embodiment of this application, when sending the uplink signal, the terminal may insert the first time interval between time periods in which the uplink signal is sent, and the satellite base station may insert the third time interval between time periods in which the uplink signal is received, to compensate for a time synchronization drift. This reduces impact of the time synchronization drift caused by movement of the satellite base station on uplink signal detection performance of the satellite base station, and improves coding performance of the satellite base station.

To make Embodiment 2 clearer, the following describes a technical solution in Embodiment 2 by using Case 1 (there is only the first time interval between the plurality of first time periods) and Case 2 (there is not only the first time interval but also a second time interval between the plurality of first time periods). In addition, for ease of description, the method provided in Embodiment 2 is described by using an example in which the first TA change rate is a TA change rate in a communication process between the terminal and the satellite base station in this application. When the first TA change rate is another case, a principle is the same. For details, refer to the foregoing descriptions for understanding.

Case 1: There is only the first time interval between the plurality of first time periods.

In Case 1, the third time period is the same as the first time period.

In Case 1, optionally, the length of the first time interval and the location of the first time interval between the plurality of first time periods are determined based on the third time interval and the first TA change rate.

In one case, when the first TA change rate is positive, the first time interval is a difference between the third time interval and a fourth time interval. When the first TA change rate is negative, the first time interval is a sum of the third time interval and a fourth time interval. The fourth time interval is a time interval obtained through calculation based on the first TA change rate. For example, the fourth time interval may be the foregoing first TA change amount. If the first time interval is a UP GAP, the third time interval is the BS GAP, and the fourth time interval is denoted as a UE GAP, when the first TA change rate is positive, UP GAP=BS GAP−UE GAP, and when the first TA change rate is negative, UP GAP=BS GAP+UE GAP.

In another case, the first time interval and the third time interval are fixed values, and the first time interval and the third time interval may be the same or may be different. Certainly, in addition to the two types, the first time interval and the third time interval may alternatively be other values. This is not limited in this application.

The first time interval is the UP GAP, and the third time interval is the BS GAP. Alternatively, the first time interval and the third time interval are used to transmit a CS. The following provides an example of the first time interval and the third time interval by using Case 1.1 (the first time interval is the UP GAP, and the third time interval is the BS GAP) and Case 1.2 (the first time interval and the third time interval are used to transmit the CS).

Case 1.1: The first time interval is the UP GAP, and the third time interval is the BS GAP.

Figure 21:
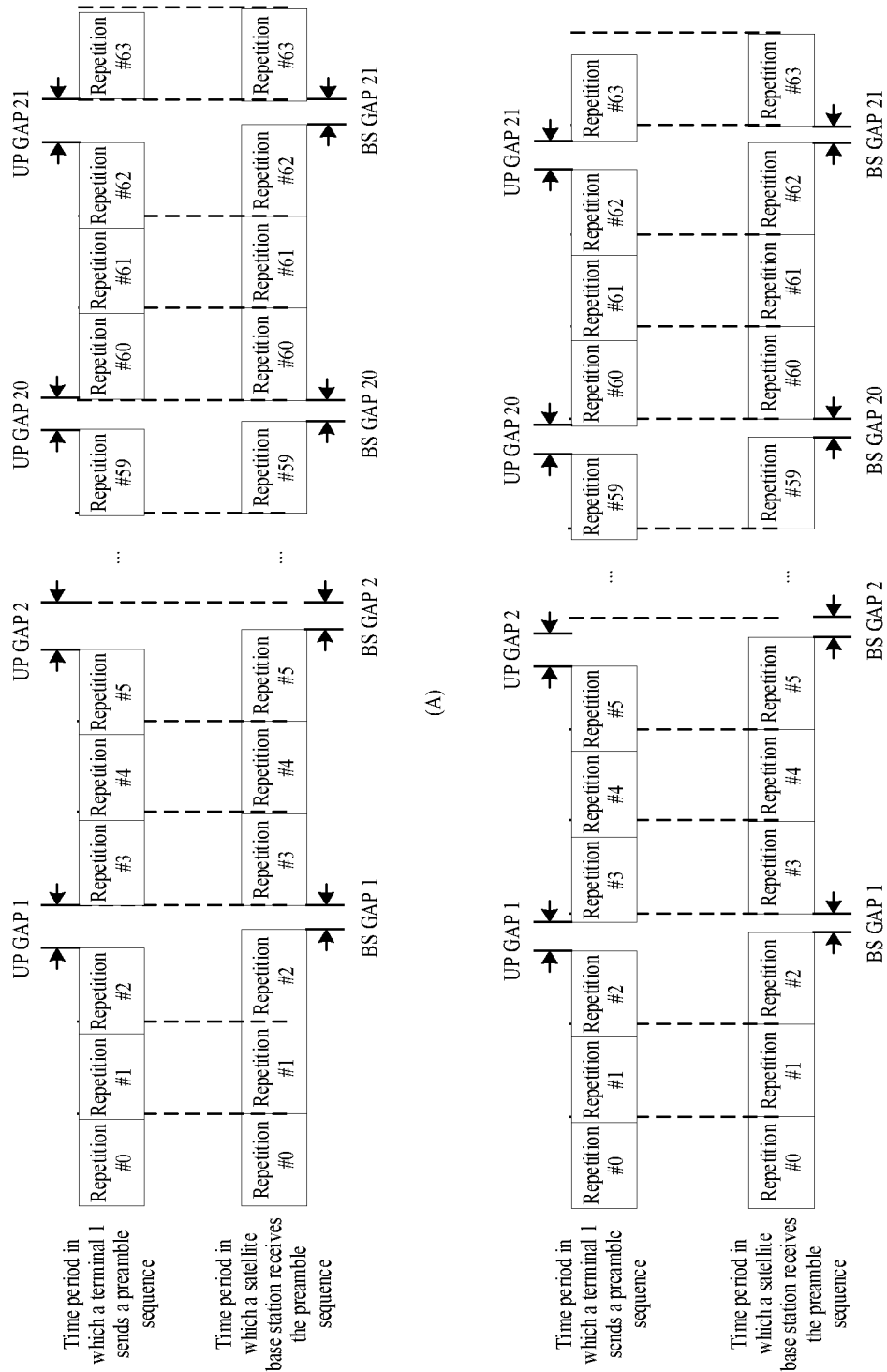
FIG. 21 is a schematic diagram of inserting a UP GAP between a preamble sequence group by a terminal and inserting a BS GAP between a preamble sequence group by a network device according to an embodiment of this application.

For example, as shown in (A) in FIG. 21 and (B) in FIG. 21, when the uplink signal is the preamble sequence, a terminal 1 may insert the UP GAP between repeated preamble sequence groups. In the UP GAP, the terminal 1 suspends sending the preamble sequence group, and continues to send the preamble sequence group after the UP GAP ends. The satellite base station may insert the BS GAP between the repeated preamble sequence group, and the satellite base station suspends receiving the preamble sequence group in the BS GAP. For example, the terminal 1 may insert one UP GAP every time three preamble sequence groups are sent, and the satellite base station may insert one BS GAP every time three preamble sequence groups are received, to compensate for a time synchronization drift. (A) in FIG. 21 shows compensation for a time synchronization drift performed by the terminal 1 based on the first TA change rate determined based on geographical location information of the terminal 1 and location information of the satellite base station, so that the time synchronization drift can be more accurately compensated for. (B) in FIG. 21 shows compensation for a time synchronization drift performed by the terminal 1 based on the first TA change rate delivered by the satellite base station.

Figure 22:
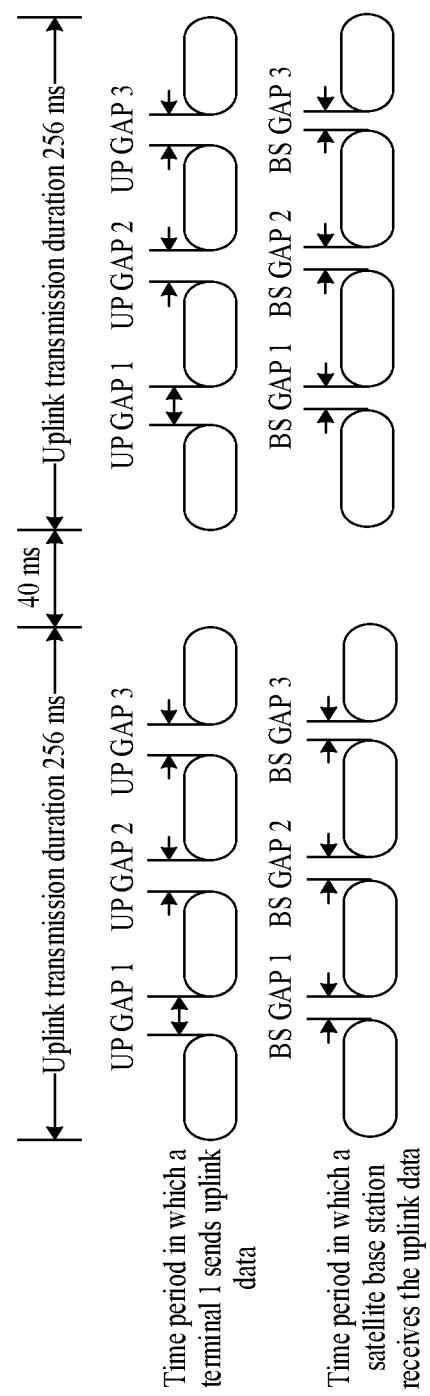
FIG. 22 is a schematic diagram of inserting a UP GAP between uplink data by a terminal and inserting a BS GAP between uplink data by a network device according to an embodiment of this application.

For example, as shown in FIG. 22, when the uplink signal is uplink data, within uplink transmission duration 256 ms, the terminal 1 may insert the UP GAP in an uplink sending process based on the third time interval and the first TA change rate; and the satellite base station may insert the BS GAP in an uplink receiving process based on the third time interval, to compensate for the time synchronization drift.

Case 1.2: The first time interval and the third time interval are used to transmit the CS.

It should be noted that, in Case 1.2, a CS corresponding to the first time period may also be sent after a last first time period.

In Case 1.2, the first time interval and the third time interval may be the same, and each are a fixed value. This greatly reduces complexity of implementation of the terminal.

Figure 23:
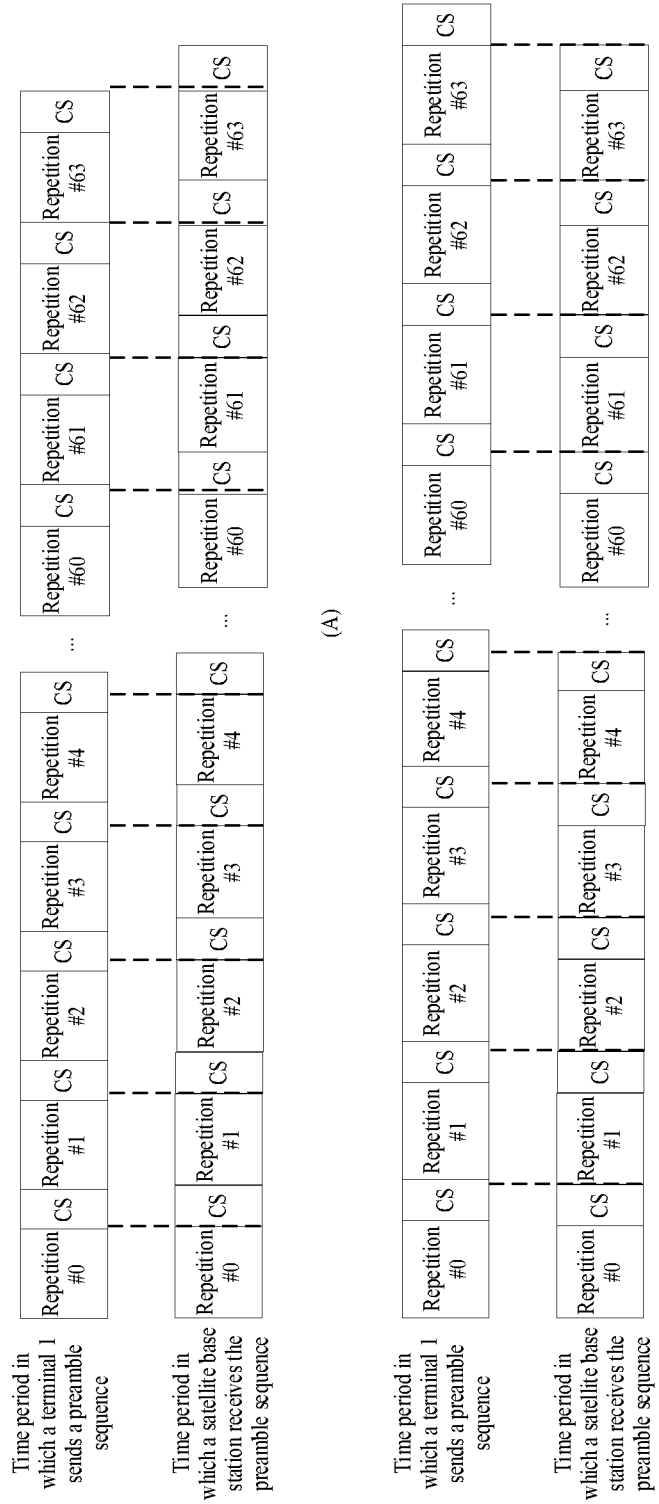
FIG. 23 is a schematic diagram of inserting a CS between preamble sequence groups by a terminal and a network device according to an embodiment of this application.

As shown in (A) in FIG. 23, when the first TA change rate is negative, the terminal and the satellite base station may add a CS after each preamble sequence group. After a boundary from which a CS is removed or a boundary of the preamble sequence group of the satellite base station is detected, a first preamble sequence group is from a start time point of the preamble sequence group to a start time point of a first CS, and each subsequent preamble sequence group is from a start time point of a CS to a start time point of a next CS. After the satellite base station detects each preamble sequence group, if the preamble sequence group includes the CS, a complete preamble sequence group may be left after the CS is removed.

As shown in (B) in FIG. 23, when the first TA change rate is positive, as shown in (B) in FIG. 23, the terminal and the satellite base station may add a CS after each preamble sequence group. After a boundary from which a CS is removed or a boundary of the preamble sequence group of the satellite base station is detected, a first preamble sequence group is from a start time point of the preamble sequence group to an end time point of a first CS, and each subsequent preamble sequence group is from an end time point of a CS to an end time point of a next CS. After the satellite base station detects each preamble sequence group, if the preamble sequence group includes the CS, a complete preamble sequence group may be left after the CS is removed.

It can be learned from (A) in FIG. 23 and (B) in FIG. 23, even if the first time interval and the third time interval are the same and each are a fixed value, a boundary from which a CS is removed or a boundary of the preamble sequence group of the satellite base station is detected based on the positive or negative first TA change rate, so that the satellite base station can obtain the complete preamble sequence group.

It should be noted that one CS is added after each preamble sequence group in (A) in FIG. 23 and (B) in FIG. 23. During actual implementation, one CS may be added after a plurality of preamble sequence groups. If the CS is added after each preamble sequence group, a detected and combined boundary of the preamble sequence coincides with a boundary of the CS. If the CS is added after the plurality of preamble sequence groups, after the CS is removed, all preamble sequence groups further need to be extracted based on a boundary of each preamble sequence group, to be combined and detected.

Figure 24:
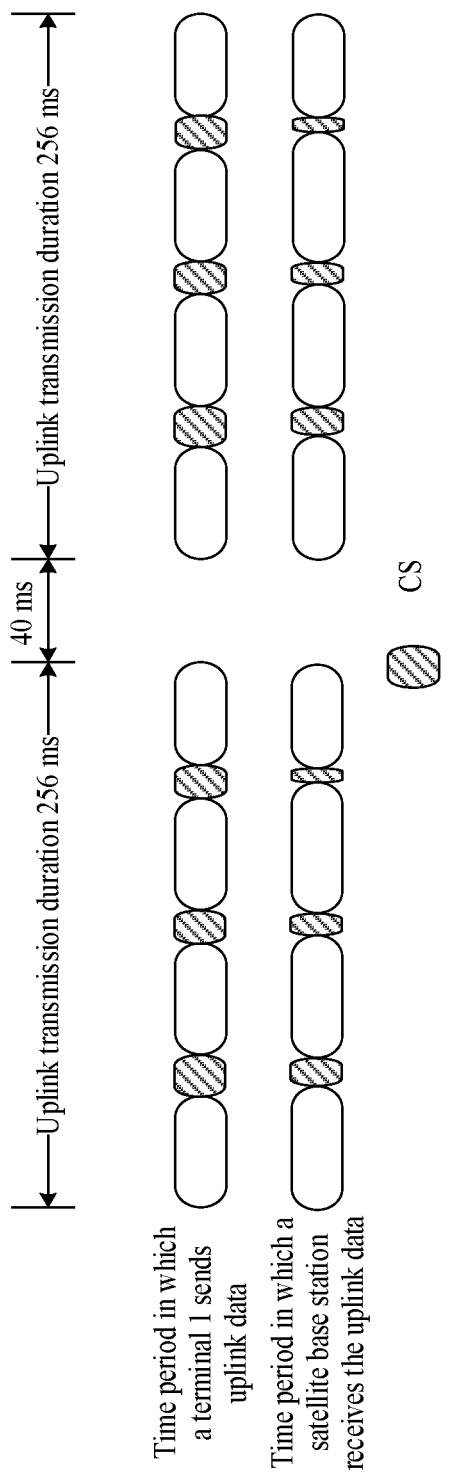
FIG. 24 is a schematic diagram of inserting a CS between uplink data by a terminal and a network device according to an embodiment of this application.

For example, as shown in FIG. 24, when the uplink signal is uplink data, within uplink transmission duration 256 ms, a terminal 1 may insert, in an uplink sending process based on the third time interval and the first TA change rate, the first time interval used to transmit the CS; and the satellite base station may insert, in an uplink receiving process based on the third time interval, the third time interval used to transmit the CS, to compensate for a time synchronization drift. In this case, even if the first time interval and the third time interval are the same and each are a fixed value, a boundary from which a CS is removed or a boundary of the uplink data of the satellite base station is detected based on the positive or negative first TA change rate, so that the satellite base station can obtain complete data in the first time period (for example, a slot or a subframe).

In Case 1.2, after detecting the uplink signal, the satellite base station may remove the CS, to obtain a required uplink signal. Specifically, after receiving the uplink signal, the satellite base station may determine, according to some algorithms, which part of the signal is the CS, and remove the CS after determining the CS, to obtain the required uplink signal. For the preamble sequence, after obtaining the plurality of preamble sequences, the satellite base station may combine the obtained preamble sequences.

In Case 1, the terminal may determine the length of the first time interval and the location of the first time interval between the plurality of first time periods in any one of the following Manner 1 to Manner 4.

Manner 1: The terminal determines the length of the third time interval and the location of the third time interval between the plurality of second time periods according to a protocol specification, and determines the length of the first time interval and the location of the first time interval between the plurality of first time periods based on the length of the third time interval, the location of the third time interval between the plurality of second time periods, and the first TA change rate.

In Manner 1, the length of the third time interval and the location of the third time interval between the plurality of second time periods may be specified in a protocol. The location of the first time interval between the plurality of first time periods is the same as the location of the third time interval between the plurality of second time periods. The length of the first time interval may be obtained through calculation based on the length of the third time interval and the first TA change rate. For details, refer to the foregoing description. Details are not described again.

Manner 2: The terminal receives first indication information from the satellite base station, where the first indication information indicates the length of the third time interval and the location of the third time interval between the plurality of second time periods, and determines the length of the first time interval and the location of the first time interval between the plurality of first time periods based on the length of the third time interval, the location of the third time interval between the plurality of second time periods, and the first TA change rate.

A difference between Manner 2 and Manner 1 lies only in that the length of the third time interval and the location of the third time interval between the plurality of second time periods may be determined by the satellite base station. In this case, the satellite base station sends the first indication information to the terminal. The first indication information may be carried in broadcast information.

Manner 3 is similar to Manner 2 in Embodiment 1. Refer to the foregoing for understanding, and details are not described again.

Manner 4 is similar to Manner 3 in Embodiment 1. Refer to the foregoing for understanding, and details are not described again.

In Manner 3 and Manner 4, the terminal may directly determine the length of the first time interval and the location of the first time interval between the plurality of first time periods based on an indication of the satellite base station and a correspondence. This can reduce complexity of the terminal.

Case 2: There is not only the first time interval but also the second time interval between the plurality of first time periods.

In Case 2, it should be noted that because the satellite base station is capable of simultaneously performing uplink sending and downlink sending, the second time interval is not required between the plurality of second time periods.

In Case 2, due to existence of the second time interval, a time synchronization drift may be partially compensated for. When the first time interval is inserted, the first time interval may be shorter, and a quantity of first time intervals may be smaller. When the second time interval and the first time interval are located between two same first time periods, the two time intervals may be combined and inserted as one time interval, or the two time intervals may not be combined and both are inserted. For details, refer to the related description in Case 2 of Embodiment 1, and details are not described again.

In Case 2, optionally, the length of the first time interval and the location of the first time interval between the plurality of third time periods are determined based on the third time interval and the first TA change rate.

Optionally, when the first TA change rate is positive, the first time interval is a difference between the third time interval and a fourth time interval. When the first TA change rate is negative, the first time interval is a sum of the third time interval and a fourth time interval. For descriptions of the optional method, refer to the foregoing Case 1 in Embodiment 2. Details are not described again.

The first time interval is a UP GAP, and the third time interval is the BS GAP. Alternatively, the first time interval and the third time interval are used to transmit a CS. The following provides an example of the first time interval, the second interval, and the third time interval by using Case 2.1 (the first time interval is the UP GAP, and the third time interval is the BS GAP) and Case 2.2 (the first time interval and the third time interval are used to transmit the CS).

Case 2.1: The first time interval is the UP GAP, and the third time interval is the BS GAP.

Figure 25:
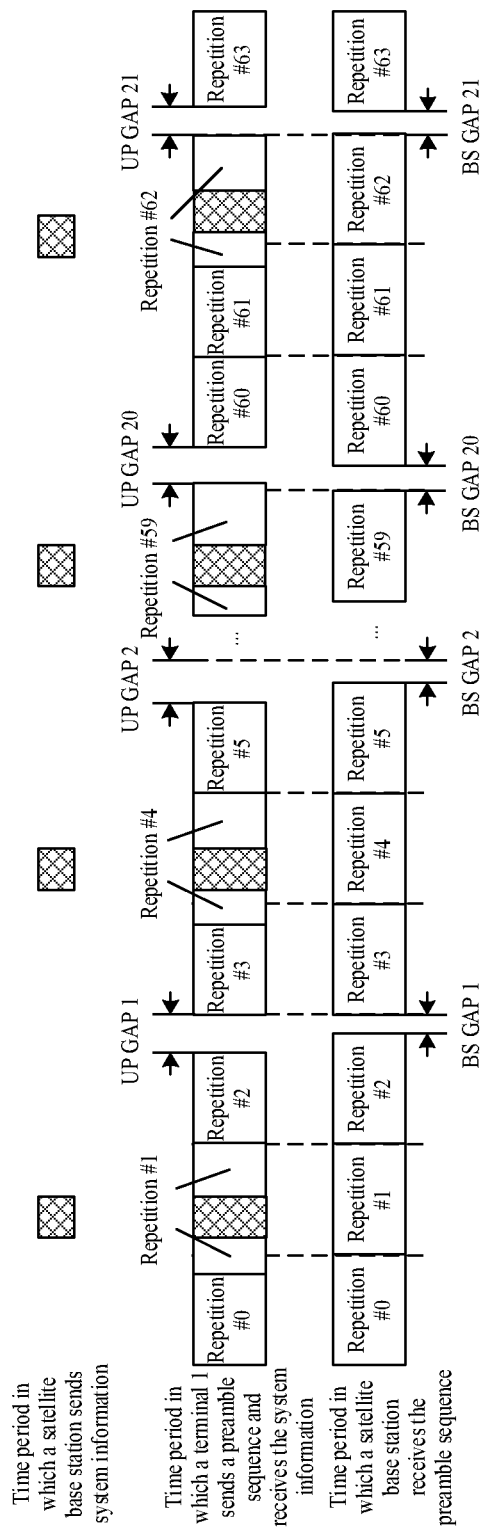
FIG. 25 is a schematic diagram of inserting a UP GAP and a second time interval between a preamble sequence group by a terminal and inserting a BS GAP between a preamble sequence group by a network device according to an embodiment of this application.

For example, as shown in FIG. 25, when the uplink signal is the preamble sequence, a terminal 1 may insert the first time interval (the UP GAP in the figure) between preamble sequence groups, and insert the second time interval based on sending duration of system information and a length of the system information. The satellite base station inserts the third time interval (the BS GAP in the figure) in a process of receiving a preamble sequence. In the first time interval, the terminal 1 does not perform uplink sending. In the second time interval, the terminal 1 suspends sending the preamble sequence group, and receives the system information. In the third time interval, the satellite base station does not receive the uplink signal. The time synchronization drift is compensated for based on the first time interval, the second time interval, and the third time interval.

Figure 26:
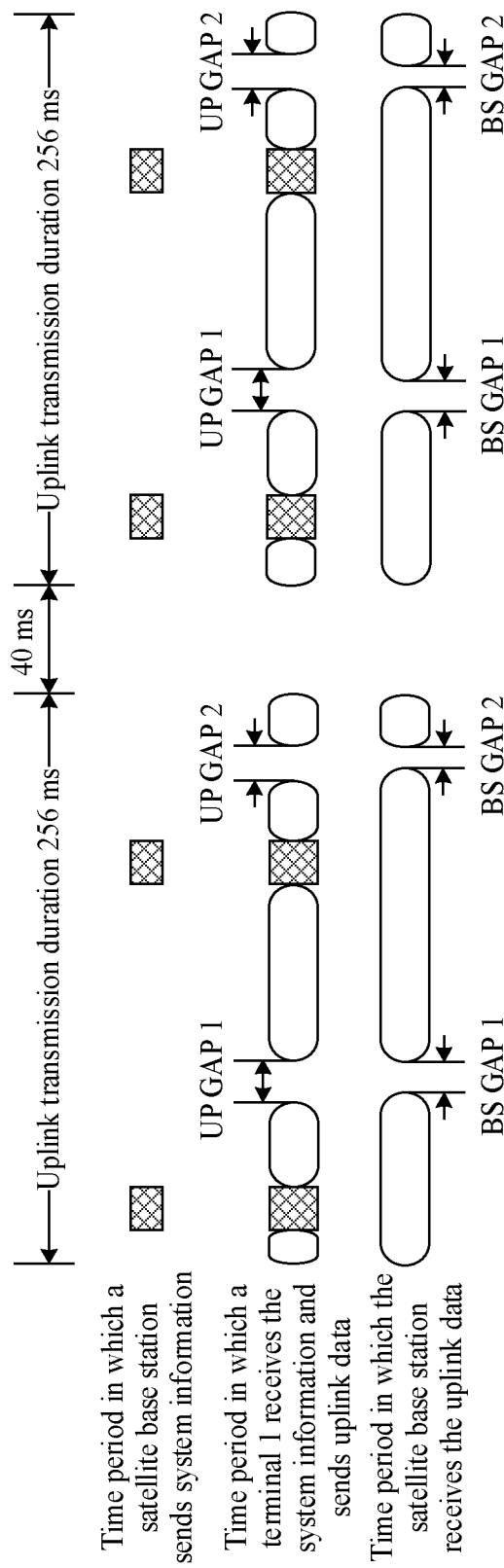
FIG. 26 is a schematic diagram of inserting a UP GAP and a second time interval between uplink data by a terminal and inserting a base station (BS) GAP between uplink data by a network device according to an embodiment of this application.

For example, as shown in FIG. 26, when the uplink signal is uplink data, within uplink transmission duration 256 ms, a terminal 1 may insert the UP GAP in an uplink sending process based on the third time interval and the first TA change rate, and insert the second time interval based on sending duration of the system information and a length of the system information, and the satellite base station may insert the BS GAP in an uplink receiving process, to compensate for the time synchronization drift.

Case 2.2: The first time interval and the third time interval are used to transmit the CS.

It should be noted that, in Case 2.2, a CS corresponding to the first time period may also be sent after a last first time period.

For example, when the uplink signal is the preamble sequence, a terminal 1 may insert, between preamble sequence groups, the first time interval used to transmit the CS, and insert the second time interval based on sending duration of system information and a length of the system information. The satellite base station inserts the third time interval in a process of receiving a preamble sequence. Specifically, the UP GAP and the BS GAP in FIG. 25 each may be understood as the CS.

For example, when the uplink signal is uplink data, within uplink transmission duration 256 ms, a terminal 1 may insert, in an uplink sending process based on the third time interval and the first TA change rate, the first time interval used to transmit the CS, and insert the second time interval based on sending duration of the system information and a length of the system information, and the satellite base station may insert, in an uplink receiving process, the third time interval used to transmit the CS, to compensate for the time synchronization drift. Specifically, the UP GAP and the BS GAP in FIG. 26 each may be understood as the CS.

In Case 2.2, after detecting the uplink signal, the satellite base station may remove the CS, to obtain a required uplink signal. For a specific process, refer to the foregoing descriptions, and details are not described again. For the preamble sequence, after obtaining the plurality of preamble sequences, the satellite base station may combine the obtained preamble sequences.

In Case 2, the terminal may determine the length of the first time interval and the location of the first time interval between the plurality of third time periods in any one of the foregoing Manner 1 to Manner 4. Only the first time period needs to be replaced with the third time period for understanding. A difference lies in that due to existence of the second time interval, the terminal needs to determine a length of the third time period based on the second time interval.

Optionally, the length of the first time interval and the location of the first time interval between the plurality of first time periods may be determined based on the first TA change rate and a type of the uplink signal. For details, refer to the related description in Embodiment 1, and details are not described again.

In the descriptions of the foregoing embodiments, a location of the UP GAP, a location of the CS, the length of the UP GAP, and the length of the CS are all described as examples. During actual implementation, the CS or UP GAP may be added after every one or more slots, every one or more subframes, every one or more preamble sequences, or every one or more preamble sequence groups. This is not limited. The UP GAP and the CS are not limited to be inserted between repeated preamble sequence groups, and may be inserted into a preamble sequence group.

During specific implementation of Embodiment 1 and Embodiment 2, the terminal may not distinguish between the first time interval and the second time interval. For the terminal, it may be considered that there is only one time interval. In one case, the time interval may occur periodically, and this duration may be less than duration of the system information (for example, may be half of the duration of the system information), the length of the time interval may be greater than or equal to a length of a time domain resource occupied by the system information. In this case, in a time interval that is the same as a time domain location of the system information, the terminal receives the system information, or in a time interval that is different from a time domain location of the system information, the terminal does not perform uplink sending, to compensate for the time synchronization drift. In another case, the time interval may not occur periodically, and lengths of different time intervals may also be different. In this case, a location of the time interval in time domain may be configured by the satellite base station or specified in a protocol. During configuration, the satellite base station may configure some time intervals to be the same as a time domain location of the system information, receive the system information in these time intervals, and compensate for the time synchronization drift in remaining time intervals.

Figure 27:
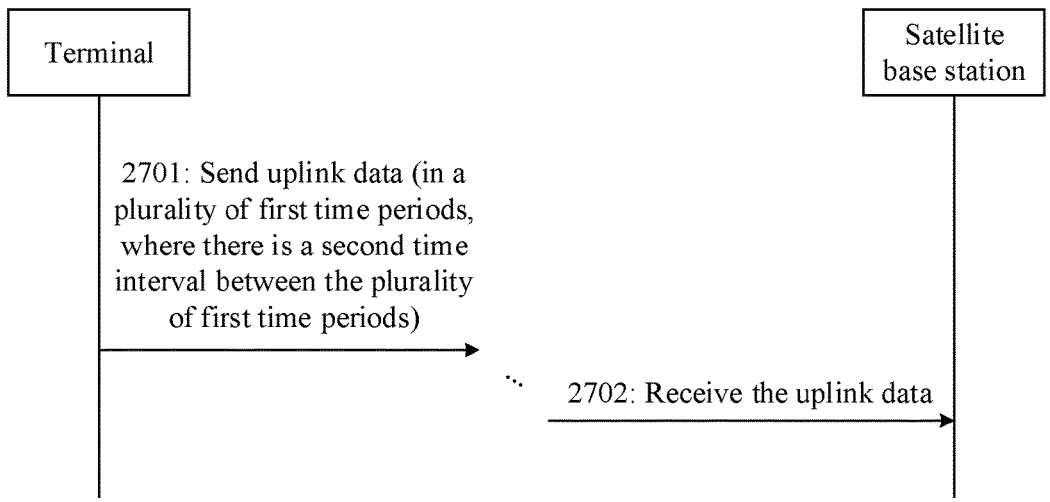
FIG. 27 is a flowchart of an uplink signal sending and receiving method according to an embodiment of this application.

When an IoT is applied to a non-terrestrial network (NTN) (such as a satellite network, an uncrewed aerial vehicle network, or a hot air balloon network), uplink data may be repeated for a long period of time. Consequently, an excessively large time synchronization drift and frequency synchronization drift affect uplink data detection performance and coding performance. However, when an existing NB IoT standard is applied to the NTN, a terminal in a connected state cannot listen to the system information. Consequently, a lot of important information synchronized with time and a frequency cannot be obtained, such as a satellite ephemeris, satellite coordinates, a TA change rate, a time sequence offset, and a Doppler compensation value. It is unfavorable for the terminal to compensate for a time synchronization drift and a frequency synchronization drift in an uplink data transmission process. To resolve this problem, this application further provides Embodiment 3. Satellite communication is used as an example. Refer to FIG. 27. A method provided in Embodiment 3 includes the following steps.

2701: A terminal sends uplink data in a plurality of first time periods, and there is a second time interval between the plurality of first time periods.

The terminal may be any terminal in terminals served by a satellite base station, and the terminal may be in a connected state. The second time interval is used to receive system information of the satellite base station. The terminal does not perform uplink sending in the second time interval, duration of the second time interval is the same as duration in which the satellite base station sends the system information, and a length of the second time interval is greater than or equal to a length of a time domain resource occupied by the system information.

Optionally, the uplink data sent in the plurality of first time periods includes repeated uplink data. For descriptions of the plurality of first time periods, refer to Embodiment 1. Details are not described again.

Figure 28:
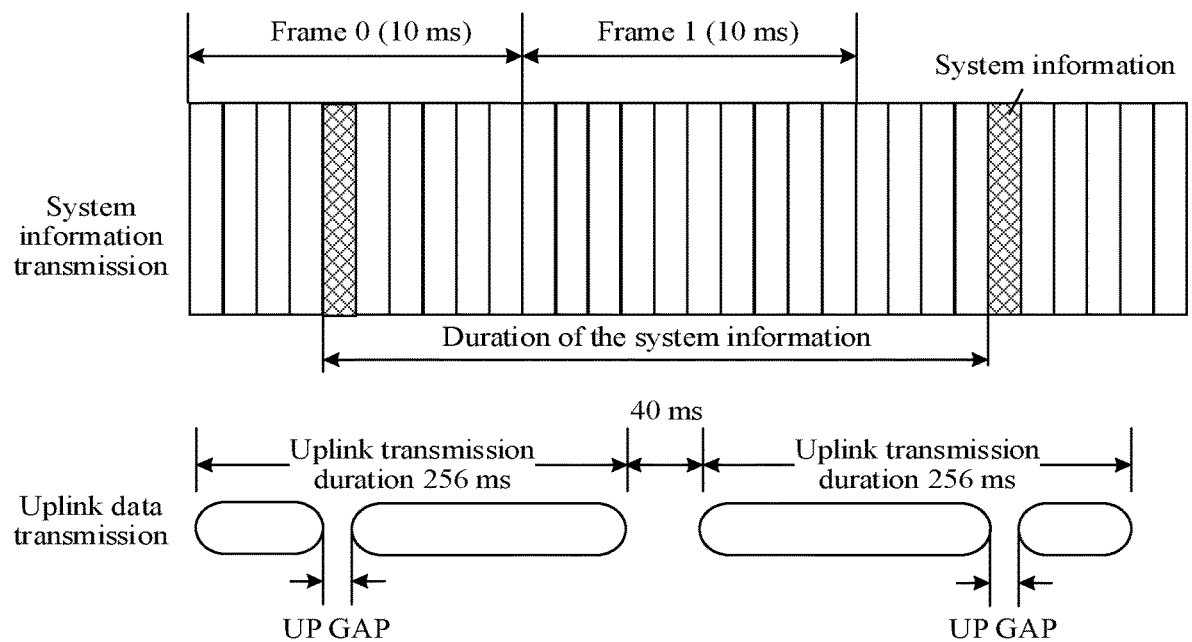
FIG. 28 is a schematic diagram of inserting a second time interval between uplink data by a terminal according to an embodiment of this application.

A start time point of uplink data transmission of the terminal is aligned with a system frame boundary/subframe boundary, and the system information, for example, a SIB 1 or broadcast information dedicated to carrying satellite-related information (such as a satellite ephemeris, satellite coordinates, a TA change rate, a time sequence offset, or a Doppler compensation value) is retransmitted and updated based on specific system frame/subframe duration. Therefore, the terminal may know a system frame boundary/subframe boundary on which the satellite base station is delivering the system information. Therefore, as shown in FIG. 28, the terminal inserts a UP GAP (which may also be referred to as an Insert GAP) in an uplink transmission process based on duration of the system information. The satellite base station knows, based on the transmission of the system information, a time point at which the terminal inserts the UP GAP, and a length of the UP GAP is greater than or equal to the duration of the system information.

2702: The satellite base station receives the uplink data from the terminal.

According to the method provided in Embodiment 3, the terminal in the connected state can obtain the system information, so that the terminal can compensate for a time synchronization drift and a frequency synchronization drift in an uplink data transmission process based on real-time satellite-related information (such as some information related to satellite mobility or a satellite location) in the system information, for example, adjust the time synchronization drift and the frequency synchronization drift based on the UP GAP. In this way, the time synchronization drift and the frequency synchronization drift that are caused by movement of the satellite base station in the uplink data transmission process are reduced. This ensures that the time synchronization drift and the frequency synchronization drift can meet a requirement of a communication system, and improves uplink data detection performance and coding performance.

The system architecture and the service scenario described in embodiments of this application are intended to describe the technical solutions in embodiments of this application more clearly, and do not constitute a limitation on the technical solutions provided in embodiments of this application. A person of ordinary skill in the art may learn that the technical solutions provided in embodiments of this application are also applicable to a similar technical problem as a network architecture evolves and a new service scenario emerges.

The foregoing mainly describes the solutions in embodiments of this application from a perspective of a method. It may be understood that, to implement the foregoing functions, each network element, for example, the first communication apparatus or the second communication apparatus, includes at least one of a corresponding hardware structure or software module for performing each function. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the first communication apparatus and the second communication apparatus may be divided into functional units based on the foregoing method examples. For example, each functional unit may be obtained through division based on each corresponding function, or two or more functions may be integrated into one processing unit. The integrated unit may be implemented in a form of hardware, or may be implemented in a form of a software functional unit. It should be noted that, in this embodiment of this application, division into the units is an example, and is merely a logical function division. During actual implementation, another division manner may be used.

Figure 29:
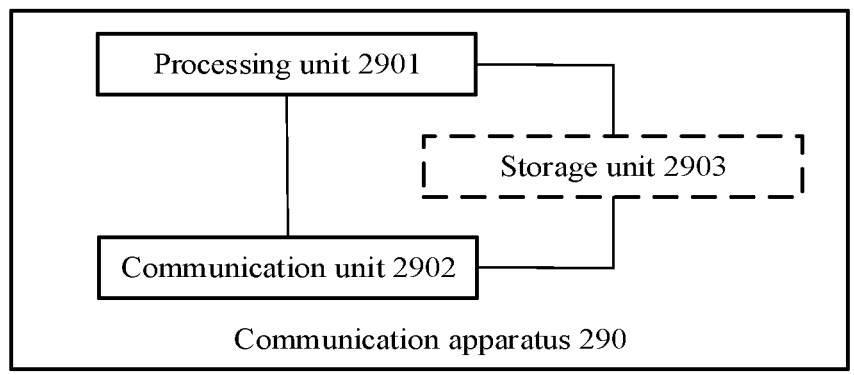
FIG. 29 is a schematic composition diagram of a communication apparatus according to an embodiment of this application.

For example, FIG. 29 is a schematic diagram of a possible structure of a communication apparatus (denoted as a communication apparatus 290) according to the foregoing embodiments. The communication apparatus 290 includes a processing unit 2901 and a communication unit 2902. Optionally, the communication apparatus 290 further includes a storage unit 2903. The communication apparatus 290 may be used to show structures of the first communication apparatus and the second communication apparatus in the foregoing embodiments.

When the schematic diagram of the structure shown in FIG. 29 is used to show the structure of the first communication apparatus in the foregoing embodiments, the processing unit 2901 is configured to control and manage an action of the first communication apparatus. For example, when the first communication apparatus is a terminal, the processing unit 2901 is configured to perform the steps 900 and 901 in FIG. 9, the steps 2000 and 2001 in FIG. 20, the step 2701 in FIG. 27, and/or an action performed by the first communication apparatus in another process described in embodiments of this application. The processing unit 2901 may communicate with another network entity by using the communication unit 2902, for example, communicate with the satellite base station in FIG. 9. The storage unit 2903 is configured to store program code and data of the first communication apparatus.

When the schematic diagram of the structure shown in FIG. 29 is used to show the structure of the second communication apparatus in the foregoing embodiments, the processing unit 2901 is configured to control and manage an action of the second communication apparatus. For example, when the second communication apparatus is a satellite base station, the processing unit 2901 is configured to perform the steps 902 and 903 in FIG. 9, the steps 2002 and 2003 in FIG. 20, the step 2702 in FIG. 27, and/or an action performed by the second communication apparatus in another process described in embodiments of this application. The processing unit 2901 may communicate with another network entity by using the communication unit 2902, for example, communicate with the terminal in FIG. 9. The storage unit 2903 is configured to store program code and data of the second communication apparatus.

For example, the communication apparatus 290 may be a device, or may be a chip or a chip system.

When the communication apparatus 290 is a device, the processing unit 2901 may be a processor, and the communication unit 2902 may be a communication interface, a transceiver, an input interface, and/or an output interface. Optionally, the transceiver may be a transceiver circuit. Optionally, the input interface may be an input circuit, and the output interface may be an output circuit.

When the communication apparatus 290 is a chip or a chip system, the communication unit 2902 may be a communication interface, an input interface and/or an output interface, an interface circuit, an output circuit, an input circuit, a pin, a related circuit, or the like on the chip or the chip system. The processing unit 2901 may be a processor, a processing circuit, a logic circuit, or the like.

When an integrated unit in FIG. 29 is implemented in a form of a software functional module and sold or used as an independent product, the integrated unit may be stored in a computer-readable storage medium. Based on such an understanding, the technical solutions in embodiments of this application essentially, or the part contributing to the conventional technology, or all or some of the technical solutions may be implemented in the form of a software product. The computer software product is stored in a storage medium and includes several instructions for instructing a computer device (which may be a personal computer, a server, or a network device) or a processor to perform all or some of the steps of the methods described in embodiments of this application. The storage medium that stores the computer software product includes any medium that can store program code, such as a Universal Serial Bus (USB) flash drive, a removable hard disk, a read-only memory (ROM), a random-access memory (RAM), a magnetic disk, or an optical disc.

Figure 30:
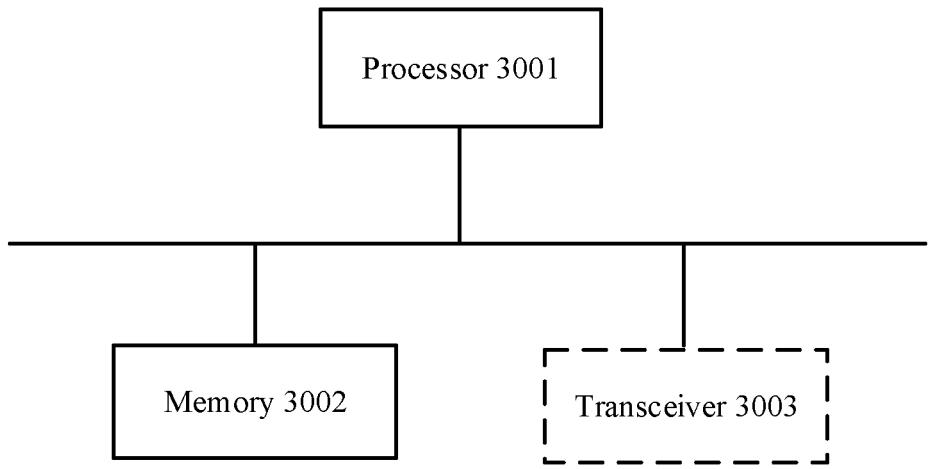
FIG. 30 is a schematic diagram of a hardware structure of a communication apparatus according to an embodiment of this application.
Figure 31:
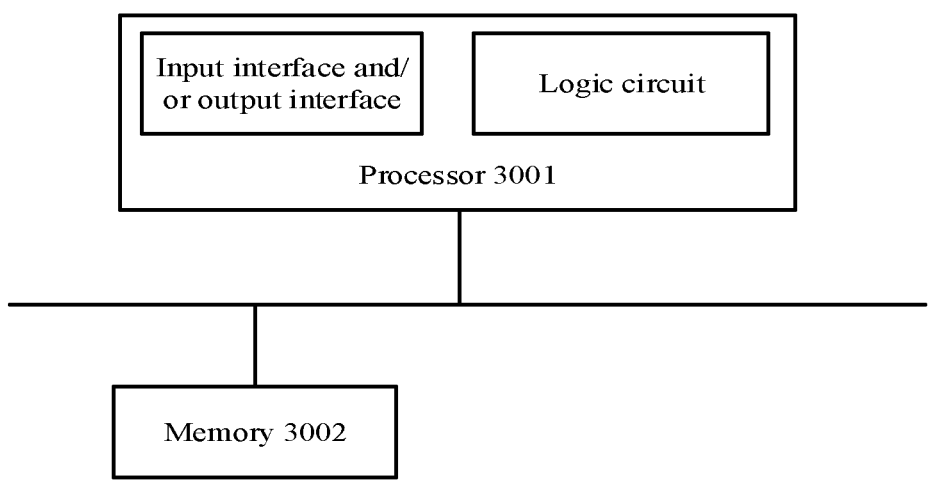
FIG. 31 is a schematic diagram of another hardware structure of a communication apparatus according to an embodiment of this application.

An embodiment of this application further provides a schematic diagram of a hardware structure of a communication apparatus. Refer to FIG. 30 or FIG. 31. The communication apparatus includes a processor 3001, and optionally, further includes a memory 3002 connected to the processor 3001.

The processor 3001 may be a general-purpose central processing unit (CPU), a microprocessor, an application-specific integrated circuit (ASIC), or one or more integrated circuits configured to control program execution of the solutions in this application. The processor 3001 may alternatively include a plurality of CPUs, and the processor 3001 may be a single-core (single-CPU) processor, or may be a multi-core (multi-CPU) processor. The processor herein may be one or more devices, circuits, or processing cores configured to process data (for example, computer program instructions).

The memory 3002 may be a ROM or another type of static storage device that can store static information and instructions, a RAM or another type of dynamic storage device that can store information and instructions, or may be an electrically erasable programmable ROM (EEPROM), a compact disc (CD) ROM (CD-ROM) or other optical disk storage, an optical disk storage (including a compact disc, a laser disc, an optical disc, a digital versatile disc, a Blu-ray disc, or the like), a magnetic disk storage medium or another magnetic storage device, or any other medium that can be used to carry or store expected program code in a form of instructions or a data structure and that can be accessed by a computer. This is not limited in this embodiment of this application. The memory 3002 may independently exist (in this case, the memory 3002 may be located outside the communication apparatus, or may be located inside the communication apparatus), or may be integrated with the processor 3001. The memory 3002 may include computer program code. The processor 3001 is configured to execute the computer program code stored in the memory 3002, to implement the method provided in embodiments of this application.

In a first possible implementation, refer to FIG. 30. The communication apparatus further includes a transceiver 3003. The processor 3001, the memory 3002, and the transceiver 3003 are connected through a bus. The transceiver 3003 is configured to communicate with another device or a communication network. Optionally, the transceiver 3003 may include a transmitter and a receiver. A component configured to implement a receiving function in the transceiver 3003 may be considered as a receiver. The receiver is configured to perform a receiving step in embodiments of this application. A component configured to implement a sending function in the transceiver 3003 may be considered as a transmitter. The transmitter is configured to perform a sending step in embodiments of this application.

Based on the first possible implementation, a schematic diagram of a structure shown in FIG. 30 may be used to show structures of the first communication apparatus and the second communication apparatus in the foregoing embodiments.

When the schematic diagram of the structure shown in FIG. 30 is used to show the structure of the first communication apparatus in the foregoing embodiments, the processor 3001 is configured to control and manage an action of the first communication apparatus. For example, when the first communication apparatus is a terminal, the processor 3001 is configured to perform the steps 900 and 901 in FIG. 9, the steps 2000 and 2001 in FIG. 20, the step 2701 in FIG. 27, and/or an action performed by the first communication apparatus in another process described in embodiments of this application. The processor 3001 may communicate with another network entity by using the transceiver 3003, for example, communicate with the satellite base station in FIG. 9. The memory 3002 is configured to store program code and data of the first communication apparatus.

When the schematic diagram of the structure shown in FIG. 30 is used to show the structure of the second communication apparatus in the foregoing embodiments, the processor 3001 is configured to control and manage an action of the second communication apparatus. For example, when the second communication apparatus is a satellite base station, the processor 3001 is configured to perform the steps 902 and 903 in FIG. 9, the steps 2002 and 2003 in FIG. 20, the step 2702 in FIG. 27, and/or an action performed by the second communication apparatus in another process described in embodiments of this application. The processor 3001 may communicate with another network entity by using the transceiver 3003, for example, communicate with the terminal in FIG. 9. The memory 3002 is configured to store program code and data of the second communication apparatus.

In a second possible implementation, the processor 3001 includes a logic circuit and an input interface and/or an output interface. For example, the output interface is configured to perform a sending action in a corresponding method, and the input interface is configured to perform a receiving action in a corresponding method.

Based on the second possible implementation, a schematic diagram of a structure shown in FIG. 31 may be used to show structures of the first communication apparatus and the second communication apparatus in the foregoing embodiments.

When the schematic diagram of the structure shown in FIG. 31 is used to show the structure of the first communication apparatus in the foregoing embodiments, the processor 3001 is configured to control and manage an action of the first communication apparatus. For example, when the first communication apparatus is a terminal, the processor 3001 is configured to perform the steps 900 and 901 in FIG. 9, the steps 2000 and 2001 in FIG. 20, the step 2701 in FIG. 27, and/or an action performed by the first communication apparatus in another process described in embodiments of this application. The processor 3001 may communicate with another network entity through the input interface and/or the output interface, for example, communicate with the satellite base station in FIG. 9. The memory 3002 is configured to store program code and data of the first communication apparatus.

When the schematic diagram of the structure shown in FIG. 31 is used to show the structure of the second communication apparatus in the foregoing embodiments, the processor 3001 is configured to control and manage an action of the second communication apparatus. For example, when the second communication apparatus is a satellite base station, the processor 3001 is configured to perform the steps 902 and 903 in FIG. 9, the steps 2002 and 2003 in FIG. 20, the step 2702 in FIG. 27, and/or an action performed by the second communication apparatus in another process described in embodiments of this application. The processor 3001 may communicate with another network entity through the input interface and/or the output interface, for example, communicate with the terminal in FIG. 9. The memory 3002 is configured to store program code and data of the second communication apparatus.

In an implementation process, the steps in the method provided in embodiments may be completed by using a hardware integrated logic circuit in the processor, or by using instructions in a form of software. The steps of the method disclosed with reference to embodiments of this application may be directly performed by a hardware processor, or may be performed by using a combination of hardware in the processor and a software module.

An embodiment of this application further provides a computer-readable storage medium, including computer-executable instructions. When the computer-executable instructions are run on a computer, the computer is enabled to perform any one of the foregoing methods.

An embodiment of this application further provides a computer program product, including computer-executable instructions. When the computer-executable instructions are run on a computer, the computer is enabled to perform any one of the foregoing methods.

An embodiment of this application further provides a communication system, including one or more of a first communication apparatus and a second communication apparatus.

An embodiment of this application further provides a communication apparatus, including a processor and an interface. The processor is coupled to a memory through the interface. When the processor executes a computer program or computer-executable instructions in the memory, any method provided in the foregoing embodiments is performed.

All or some of the foregoing embodiments may be implemented by using software, hardware, firmware, or any combination thereof. When a software program is used to implement embodiments, embodiments may be implemented completely or partially in a form of a computer program product. The computer program product includes one or more computer instructions. When the computer program instructions are loaded and executed on the computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a Digital Versatile Disc (DVD)), a semiconductor medium (for example, a solid-state drive (SSD)), or the like.

Although this application is described with reference to embodiments, in a process of implementing this application that claims protection, a person skilled in the art may understand and implement another variation of the disclosed embodiments by viewing the accompanying drawings, disclosed content, and the appended claims. In the claims, "comprising" (comprising) does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce better effect.

Although this application is described with reference to specific features and the embodiments thereof, it is clear that various modifications and combinations may be made to them without departing from the protection scope of this application. Correspondingly, the specification and accompanying drawings are merely example descriptions of this application defined by the appended claims, and are considered as any of or all modifications, variations, combinations or equivalents that cover the scope of this application. It is clear that a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A method implemented by a first communication apparatus, wherein the method comprises:
    obtaining a first timing advance (TA) change rate, wherein the first TA change rate is in a communication process of the first communication apparatus; and
    sending an uplink signal in a plurality of first time periods, wherein there is a first time interval between the first time periods,
    wherein a first length of the first time interval and a first location of the first time interval are based on the first TA change rate,
    wherein the first length and a second location of the first time interval between a plurality of third time periods are based on a second time interval and the first TA change rate, wherein the second time interval is between a plurality of second time periods in which a second communication apparatus receives the uplink signal, wherein a second time period between every two adjacent first time intervals is one third time period, and wherein a fourth time period before an initial first time interval and a fifth time period after a last first time interval each are one third time period.

2. The method of claim 1, further comprising:
    skipping performing uplink sending in the first time interval; or
    sending a cyclic suffix (CS) of a signal in the first time interval.

3. The method of claim 1, further comprising skipping performing uplink sending in a third time interval between the first time periods, wherein the third time interval is for receiving system information of the second communication apparatus, wherein a first duration of the third time interval is the same as a second duration in which the second communication apparatus sends the system information, and wherein a second length of the third time interval is greater than or equal to a third length of a time domain resource of the system information.

4. The method of claim 1, wherein obtaining the first TA change rate comprises:

determining the first TA change rate based on geographical location information of the first communication apparatus and location information of the second communication apparatus; or receiving the first TA change rate from the second communication apparatus.

5. The method of claim 1, wherein the first length is greater than or equal to a TA change amount in the communication process in a sixth time period that is before the first time interval and adjacent to the first time interval.

6. The method of claim 1, wherein the first time interval is a difference between the second time interval and a sixth time interval when the first TA change rate is positive, wherein the first time interval is a sum of the second time interval and a seventh time interval when the first TA change rate is negative, and wherein the sixth time interval or the seventh time interval is based on the first TA change rate.

7. The method of claim 1, wherein a first quantity of third time periods is the same as a second quantity of the second time periods, and wherein the second location is the same as a third location of the second time interval.

8. The method of claim 7, further comprising:
receiving, from the second communication apparatus, first indication information indicating a third length of the second time interval and the third location or determining the third length and the third location according to a protocol specification; and
determining the first length of the first time interval and the second location based on the third length, the third location, and the first TA change rate.

9. The method of claim 8, further comprising:
receiving, from the second communication apparatus, second indication information indicating a first index, wherein the first index indicates a fourth length of a fourth time interval and a fourth location of the fourth time interval between the plurality of first time periods; and
determining that the fourth length corresponding to the first index and the fourth location are respectively the first length and the first location.

10. The method of claim 1, further comprising:
storing a correspondence among the TA change rate, a length of a time interval, and a location of the time interval between the plurality of first time periods; and
determining the first length and the location of the first time interval from the correspondence based on the first TA change rate.

11. The method of claim 1, wherein the uplink signal comprises a repeated signal.

12. The method of claim 1, wherein the first time interval occurs periodically, and wherein the method further comprises determining the first location based on a duration of the first time interval.

13. The method of claim 1, wherein the uplink signal is a preamble sequence or uplink data.

14. The method of claim 1, wherein each of the first time periods is one or more slots, one or more subframes, or a duration for sending one or more preamble sequences.

15. The method of claim 1, further comprising determining the first length and the first location based on the first TA change rate and a type of the uplink signal.

16. The method of claim 1, further comprising:
determining the first location; and
calculating the first length based on the first TA change rate.

17. A first communication apparatus, comprising:
a processor configured to obtain a first timing advance (TA) change rate, wherein the first TA change rate is in a communication process of the first communication apparatus; and
a transceiver coupled to the processor and configured to send an uplink signal in a plurality of first time periods,
wherein there is a first time interval between the plurality of first time periods,
wherein a length of the first time interval and a first location of the first time interval are based on the first TA change rate,
wherein the length and a second location of the first time interval between a plurality of third time periods are based on a second time interval and the first TA change rate, wherein the second time interval is between a plurality of second time periods in which a second communication apparatus receives the uplink signal, wherein a second time period between every two adjacent first time intervals is one third time period, and wherein a fourth time period before an initial first time interval and a fifth time period after a last first time interval each are one third time period.

18. The first communication apparatus of claim 17, wherein the processor is further configured to skip performing uplink sending in the first time interval, or the transceiver is further configured to send a cyclic suffix (CS) of a signal in the first time interval.

19. A computer program product comprising computer-executable instructions that are stored on a non-transitory computer-readable storage medium and that, when executed by a processor, cause a first communication apparatus to:
obtain a first timing advance (TA) change rate, wherein the first TA change rate is in a communication process of the first communication apparatus; and
send an uplink signal in a plurality of first time periods, wherein there is a first time interval between the first time periods,
wherein a first length of the first time interval and a first location of the first time interval are based on the first TA change rate,
wherein the first length and a second location of the first time interval between a plurality of third time periods are based on a second time interval and the first TA change rate, wherein the second time interval is between a plurality of second time periods in which a second communication apparatus receives the uplink signal, wherein a second time period between every two adjacent first time intervals is one third time period, and wherein a fourth time period before an initial first time interval and a fifth time period after a last first time interval each are one third time period.

* * * * *